US008560387B2

(12) United States Patent
Amidon et al.

(10) Patent No.: US 8,560,387 B2
(45) Date of Patent: Oct. 15, 2013

(54) SYSTEMS AND METHODS OF PROVIDING COLLABORATIVE CONSUMER-CONTROLLED ADVERTISING ENVIRONMENTS

(75) Inventors: Christopher Amidon, Apex, NC (US); Gregory M. Evans, Raleigh, NC (US); Richard Walsh, Raleigh, NC (US)

(73) Assignee: Qurio Holdings, Inc., Raleigh, NC (US)

(*) Notice: Subject to any disclaimer, the term of this patent is extended or adjusted under 35 U.S.C. 154(b) by 1156 days.

(21) Appl. No.: 11/768,600

(22) Filed: Jun. 26, 2007

(65) Prior Publication Data

US 2008/0307066 A1 Dec. 11, 2008

Related U.S. Application Data

(63) Continuation-in-part of application No. 11/759,532, filed on Jun. 7, 2007.

(51) Int. Cl.
*G06Q 30/00* (2006.01)

(52) U.S. Cl.
USPC .............................. 705/14.4; 709/217; 725/37

(58) Field of Classification Search
USPC ....................... 705/14, 14.4; 709/217; 725/37
See application file for complete search history.

(56) References Cited

U.S. PATENT DOCUMENTS 4,775,935 A 10/1988 Yourick
5,404,393 A 4/1995 Remillard
5,534,911 A 7/1996 Levitan
5,557,721 A 9/1996 Fite et al.
5,636,346 A 6/1997 Saxe
5,664,948 A 9/1997 Dimitriadis et al.

(Continued)

FOREIGN PATENT DOCUMENTS

EP 1 182 879 A2 1/2001
EP 1 162 840 A2 6/2001

(Continued)

OTHER PUBLICATIONS

No Author, "Advertisement Bidding System and Method," (article), date unknown, 20 pages, http://www.priorartdatabase.com/IPCOM/000138556.

(Continued)

*Primary Examiner* — Michael Bekerman
*Assistant Examiner* — Mario Iosif
(74) *Attorney, Agent, or Firm* — Withrow & Terranova, PLLC

(57) ABSTRACT

Targeted or other advertising may comprise one or more advertisements presented to multiple users in a virtual world environment such that participating users can interact with one another and/or with executed advertisements. Groups of users may be invited to participate in collaborative virtual world environments based on consumer contact lists or profiles establishing matching preferences for such groups. Synchronized data may be narrowcasted or broadcasted to invited users. Such data may define one or more virtual world environments as well as traditional and/or virtual world advertisements for execution in the shared environment(s). Advertisements may be selected based on one or more consumer preferences associated with one or more of the users participating in the shared virtual world environment.

28 Claims, 12 Drawing Sheets

(56) References Cited

U.S. PATENT DOCUMENTS

| | | | | |
|---|---|---|---|---|
| 5,724,521 | A | 3/1998 | Dedrick | |
| 5,740,549 | A | 4/1998 | Reilly et al. | |
| 5,794,207 | A | 8/1998 | Walker et al. | |
| 5,794,210 | A | 8/1998 | Goldhaber et al. | |
| 5,855,008 | A | 12/1998 | Goldhaber et al. | |
| 5,933,811 | A | 8/1999 | Angles et al. | |
| 5,959,623 | A | 9/1999 | van Hoff et al. | |
| 5,974,398 | A | 10/1999 | Hanson et al. | |
| 5,983,214 | A | 11/1999 | Lang et al. | |
| 5,995,943 | A | 11/1999 | Bull et al. | |
| 6,025,837 | A | 2/2000 | Matthews, III et al. | |
| 6,081,278 | A * | 6/2000 | Chen | 345/473 |
| 6,112,186 | A | 8/2000 | Bergh et al. | |
| 6,134,532 | A | 10/2000 | Lazarus et al. | |
| 6,195,091 | B1 | 2/2001 | Harple et al. | |
| 6,240,555 | B1 | 5/2001 | Shoff et al. | |
| 6,324,519 | B1 | 11/2001 | Eldering | |
| 6,329,986 | B1 * | 12/2001 | Cheng | 345/419 |
| 6,359,622 | B1 | 3/2002 | Hayes-Roth | |
| 6,446,261 | B1 | 9/2002 | Rosser | |
| 6,456,286 | B1 * | 9/2002 | Arai et al. | 345/423 |
| 6,519,571 | B1 | 2/2003 | Guheen et al. | |
| 6,718,551 | B1 | 4/2004 | Swix et al. | |
| 6,758,746 | B1 | 7/2004 | Hunter et al. | |
| 6,772,195 | B1 | 8/2004 | Hatlelid et al. | |
| 6,820,277 | B1 | 11/2004 | Eldering et al. | |
| 6,948,131 | B1 | 9/2005 | Neven et al. | |
| 6,954,728 | B1 * | 10/2005 | Kusumoto et al. | 705/1 |
| 6,973,436 | B1 | 12/2005 | Shkedi | |
| 6,983,478 | B1 | 1/2006 | Grauch et al. | |
| 6,985,882 | B1 | 1/2006 | Del Sesto | |
| 6,985,966 | B1 * | 1/2006 | Gupta et al. | 709/248 |
| 7,039,932 | B2 | 5/2006 | Eldering | |
| 7,043,746 | B2 | 5/2006 | Ma | |
| 7,065,550 | B2 | 6/2006 | Raghunandan | |
| 7,085,732 | B2 | 8/2006 | Gould | |
| 7,136,871 | B2 | 11/2006 | Ozer et al. | |
| 7,155,680 | B2 | 12/2006 | Akazawa et al. | |
| 7,158,959 | B1 | 1/2007 | Chickering et al. | |
| 2001/0049620 | A1 | 12/2001 | Blasko | |
| 2001/0056577 | A1 | 12/2001 | Gordon et al. | |
| 2002/0002488 | A1 | 1/2002 | Muyres et al. | |
| 2002/0004744 | A1 | 1/2002 | Muyres et al. | |
| 2002/0007488 | A1 * | 1/2002 | Kikinis et al. | 725/40 |
| 2002/0013757 | A1 | 1/2002 | Bykowsky et al. | |
| 2002/0019769 | A1 | 2/2002 | Barritz et al. | |
| 2002/0019774 | A1 | 2/2002 | Kanter | |
| 2002/0042782 | A1 | 4/2002 | Albazz et al. | |
| 2002/0046084 | A1 | 4/2002 | Steele et al. | |
| 2002/0046099 | A1 | 4/2002 | Frengut et al. | |
| 2002/0059094 | A1 | 5/2002 | Hosea et al. | |
| 2002/0083441 | A1 | 6/2002 | Flickinger et al. | |
| 2002/0085031 | A1 | 7/2002 | Conrado et al. | |
| 2002/0087402 | A1 | 7/2002 | Zustak et al. | |
| 2002/0092017 | A1 | 7/2002 | Klosterman et al. | |
| 2002/0095333 | A1 | 7/2002 | Jokinen et al. | |
| 2002/0113820 | A1 * | 8/2002 | Robinson et al. | 345/764 |
| 2002/0120506 | A1 | 8/2002 | Hagen | |
| 2002/0124182 | A1 | 9/2002 | Bacso et al. | |
| 2002/0129368 | A1 | 9/2002 | Schlack et al. | |
| 2002/0138291 | A1 | 9/2002 | Vaidyanathan et al. | |
| 2002/0138440 | A1 | 9/2002 | Vaidyanathan et al. | |
| 2002/0152117 | A1 | 10/2002 | Cristofalo et al. | |
| 2002/0178447 | A1 | 11/2002 | Plotnick et al. | |
| 2002/0184047 | A1 * | 12/2002 | Plotnick et al. | 705/1 |
| 2002/0194215 | A1 | 12/2002 | Cantrell et al. | |
| 2002/0198746 | A1 | 12/2002 | Bending | |
| 2003/0005439 | A1 * | 1/2003 | Rovira | 725/37 |
| 2003/0008613 | A1 | 1/2003 | Karr et al. | |
| 2003/0023489 | A1 | 1/2003 | McGuire et al. | |
| 2003/0067554 | A1 | 4/2003 | Klarfeld et al. | |
| 2003/0101449 | A1 | 5/2003 | Bentolila et al. | |
| 2003/0101450 | A1 | 5/2003 | Davidsson et al. | |
| 2003/0115597 | A1 | 6/2003 | Yassin et al. | |
| 2003/0139966 | A1 * | 7/2003 | Sirota et al. | 705/14 |
| 2003/0149975 | A1 | 8/2003 | Eldering et al. | |
| 2003/0154475 | A1 | 8/2003 | Rodriguez et al. | |
| 2003/0174178 | A1 | 9/2003 | Hodges | |
| 2003/0226142 | A1 | 12/2003 | Rand | |
| 2003/0231854 | A1 | 12/2003 | Derrenberger | |
| 2004/0025174 | A1 | 2/2004 | Cerrato | |
| 2004/0053690 | A1 | 3/2004 | Fogel et al. | |
| 2004/0073924 | A1 | 4/2004 | Pendakur | |
| 2004/0078432 | A1 | 4/2004 | Manber et al. | |
| 2004/0107437 | A1 | 6/2004 | Reichardt et al. | |
| 2004/0133512 | A1 | 7/2004 | Woolston | |
| 2004/0139025 | A1 | 7/2004 | Coleman | |
| 2004/0162759 | A1 | 8/2004 | Willis | |
| 2004/0193484 | A1 | 9/2004 | Allen | |
| 2004/0213542 | A1 | 10/2004 | Hamasaka et al. | |
| 2004/0215568 | A1 * | 10/2004 | Fukushima et al. | 705/51 |
| 2005/0010637 | A1 | 1/2005 | Dempski et al. | |
| 2005/0015725 | A1 | 1/2005 | Matsuda | |
| 2005/0030309 | A1 | 2/2005 | Gettman et al. | |
| 2005/0033641 | A1 * | 2/2005 | Jha et al. | 705/14 |
| 2005/0049919 | A1 | 3/2005 | Disterdick | |
| 2005/0086605 | A1 | 4/2005 | Ferrer et al. | |
| 2005/0091109 | A1 | 4/2005 | Howard et al. | |
| 2005/0091111 | A1 | 4/2005 | Green et al. | |
| 2005/0091160 | A1 | 4/2005 | Kitze et al. | |
| 2005/0097599 | A1 | 5/2005 | Plotnick et al. | |
| 2005/0108776 | A1 | 5/2005 | Carver et al. | |
| 2005/0132420 | A1 | 6/2005 | Howard et al. | |
| 2005/0137958 | A1 | 6/2005 | Huber et al. | |
| 2005/0138658 | A1 | 6/2005 | Bryan | |
| 2005/0165638 | A1 | 7/2005 | Piller | |
| 2005/0171832 | A1 | 8/2005 | Hull et al. | |
| 2005/0177385 | A1 | 8/2005 | Hull et al. | |
| 2005/0179685 | A1 | 8/2005 | Kake et al. | |
| 2005/0188402 | A1 | 8/2005 | de Andrade et al. | |
| 2005/0216346 | A1 * | 9/2005 | Kusumoto et al. | 705/14 |
| 2005/0283796 | A1 | 12/2005 | Flickinger | |
| 2006/0015904 | A1 | 1/2006 | Marcus | |
| 2006/0026067 | A1 | 2/2006 | Nicholas et al. | |
| 2006/0036490 | A1 | 2/2006 | Sagalyn | |
| 2006/0064645 | A1 | 3/2006 | Neven et al. | |
| 2006/0085254 | A1 | 4/2006 | Grim, III et al. | |
| 2006/0085815 | A1 | 4/2006 | Nguyen-Tran | |
| 2006/0100923 | A1 | 5/2006 | Courchesne | |
| 2006/0100928 | A1 | 5/2006 | Walczak, Jr. et al. | |
| 2006/0111979 | A1 | 5/2006 | Chu | |
| 2006/0123448 | A1 | 6/2006 | Ma et al. | |
| 2006/0128469 | A1 | 6/2006 | Willis et al. | |
| 2006/0135232 | A1 | 6/2006 | Willis et al. | |
| 2006/0135732 | A1 | 6/2006 | Yeager | |
| 2006/0148512 | A1 | 7/2006 | Ekholm et al. | |
| 2006/0155597 | A1 | 7/2006 | Gleason | |
| 2006/0184579 | A1 | 8/2006 | Mills et al. | |
| 2006/0200434 | A1 | 9/2006 | Flinn et al. | |
| 2006/0212350 | A1 | 9/2006 | Ellis et al. | |
| 2006/0253323 | A1 | 11/2006 | Phan et al. | |
| 2006/0271997 | A1 | 11/2006 | Jacoby et al. | |
| 2006/0287915 | A1 | 12/2006 | Boulet et al. | |
| 2006/0288362 | A1 | 12/2006 | Pulton, Jr. et al. | |
| 2006/0293954 | A1 | 12/2006 | Anderson et al. | |
| 2007/0011050 | A1 | 1/2007 | Klopf et al. | |
| 2007/0033107 | A1 * | 2/2007 | Ubale et al. | 705/14 |
| 2007/0061204 | A1 | 3/2007 | Ellis et al. | |
| 2007/0073614 | A1 | 3/2007 | Jung et al. | |
| 2007/0106526 | A1 | 5/2007 | Jung et al. | |
| 2007/0150537 | A1 | 6/2007 | Graham | |
| 2007/0244750 | A1 | 10/2007 | Grannan et al. | |
| 2007/0299743 | A1 | 12/2007 | Staib et al. | |

FOREIGN PATENT DOCUMENTS

| | | | |
|---|---|---|---|
| EP | 1190579 | | 3/2002 |
| WO | WO 01/07985 | A2 | 2/2001 |
| WO | WO 01/11882 | A1 | 2/2001 |
| WO | WO 01/52541 | A1 | 7/2001 |
| WO | WO 01/82597 | A1 | 11/2001 |
| WO | WO 02/19581 | A1 | 3/2002 |
| WO | WO 03/063041 | A2 | 7/2003 |

(56) References Cited

FOREIGN PATENT DOCUMENTS

| | | | |
|---|---|---|---|
| WO | WO 2004/064042 | A2 | 7/2004 |
| WO | WO 2006/127645 | A2 | 11/2006 |
| WO | WO 2006/0135981 | A1 | 12/2006 |

OTHER PUBLICATIONS

International Search Report and Written Opinion for PCT/US08/67349 mailed Oct. 2, 2008.

About Us page for www.visibleworld.com (accessed Sep. 21, 2007).

Definition of Virtual Word from Wikipedia (accessed Sep. 21, 2007).

Home Page for www.ajax3d.org (accessed Sep. 21, 2007).

Home Page for www.multiverse.net (accessed Sep. 21, 2007).

Home Page for www.diverse-vr.org (accessed Sep. 21, 2007).

International Search Report for PCT/US08/74140 mailed Nov. 13, 2008, 10 pages.

* cited by examiner

SYSTEMS AND METHODS OF PROVIDING COLLABORATIVE CONSUMER-CONTROLLED ADVERTISING ENVIRONMENTS

PRIORITY CLAIM

This application claims the benefit of priority as a continuation-in-part application of previously filed U.S. Utility patent application entitled "METHODS AND SYSTEMS OF PRESENTING ADVERTISEMENTS IN CONSUMER-DEFINED ENVIRONMENTS", filed Jun. 7, 2007 and assigned U.S. Ser. No. 11/759,532 which is incorporated by reference herein in its entirety for all purposes.

FIELD OF THE INVENTION

The present invention relates generally to advertising, including methods and systems that can provide for interactive advertising to multiple consumers using collaborative environment(s) that are controlled in part by one or more consumers.

BACKGROUND OF THE INVENTION

Targeted or narrowcast advertising can provide a more effective model for merchants and other advertisers to reach consumers. By better matching ad content with entertainment content and user preferences, a more personalized viewing experience is possible with less resistance to the commercial content from the consumer. Thus, associated commercial content may be received more favorably. Such commercial content, although potentially targeted and/or personalized, is often limited in some contexts to traditional video advertisements.

Variable delivery options for programming, advertising, and other content are due at least in part to continued development of computing devices such as set top boxes (STBs) for cable, satellite and IPTV (internet protocol television), as well as integration of some or all such functionality into televisions and other displays. For example, so-called "interactive" ads have been proposed whereby a viewer must provide responses during the course of an advertisement, such as choices for determining an ending in an advertisement with a variable storyline.

As systems emerge with that can tailor advertising to individual consumers, and as flexibility and user control are enabled at consumer systems (e.g., set top boxes), consumers will be more open to accepting and expecting alternative methods for delivery of advertisements. Although such options and functionality have been used to provide for different advertising systems and plans, there remains a continuing need for advertisements that appeal to consumers.

SUMMARY OF THE INVENTION

Objects and advantages of the present invention will be apparent to one of skill in the art upon careful review of the disclosure and/or practice of the subject matter. Such objects and advantages include providing methods and systems for providing advertising that appeals to consumers by presenting advertisements in one or more environments constructed based on consumer preferences. Such advertisements are also provided to groups of users who are selected in part based on consumer preferences.

For example, as will be discussed below, in some embodiments of the present subject matter, a consumer can view one or more advertisements that are presented in the context of a virtual world. The same virtual world environment and/or advertisements presented in the context of such virtual world are executed on systems associated with a plurality of users, thus affording participating users an opportunity to view ads and interact with other users and/or with the advertisement itself in a synchronized fashion. Advertisements can be narrowcasted or broadcasted to participating users and may be targeted to profiles, preferences or other parameters associated with one or more users participating in a collaborative virtual world environment.

In some embodiments, the virtual world advertisements may be distributed alongside or in a manner similar to the distribution of non-virtual world advertisements so that specialized equipment may not be necessary to view the virtual world advertisements when available. Additionally, in some embodiments, the availability of virtual world advertisements may be considered in contexts such as negotiation for display of ads, consumer targeting, and ad selection.

An advertising system and method can include various combinations of features that allow for a user (or consumer) to have control over certain aspects of the collaborative advertising environment. For example, users may have control over the type(s) of shared virtual world environments that can be displayed and/or the advertisements that are executed in associated with the shared environments. In other example, users may have control over which users participate in an interactive shared virtual world environment.

In some embodiments, coordination in a virtual world environment is handled for multiple advertisements and among multiple consumers. Also, multiple active virtual world environments may be available to a given user allowing for dynamic selection by the user of environments and associated advertisements in which to participate. In some embodiments, the one or more virtual worlds may be rendered for the duration of a given media program or portion of content, even during portions of time when advertisements are not being executed.

BRIEF DESCRIPTION OF THE SEVERAL VIEWS OF THE DRAWINGS

A full and enabling disclosure including the best mode of practicing the appended claims and directed to one of ordinary skill in the art is set forth more particularly in the remainder of the specification. The specification makes reference to the appended figures, in which:

Use of like reference numerals in different features is intended to illustrate like or analogous components.

DETAILED DESCRIPTION OF THE PREFERRED EMBODIMENTS

Figure 1:
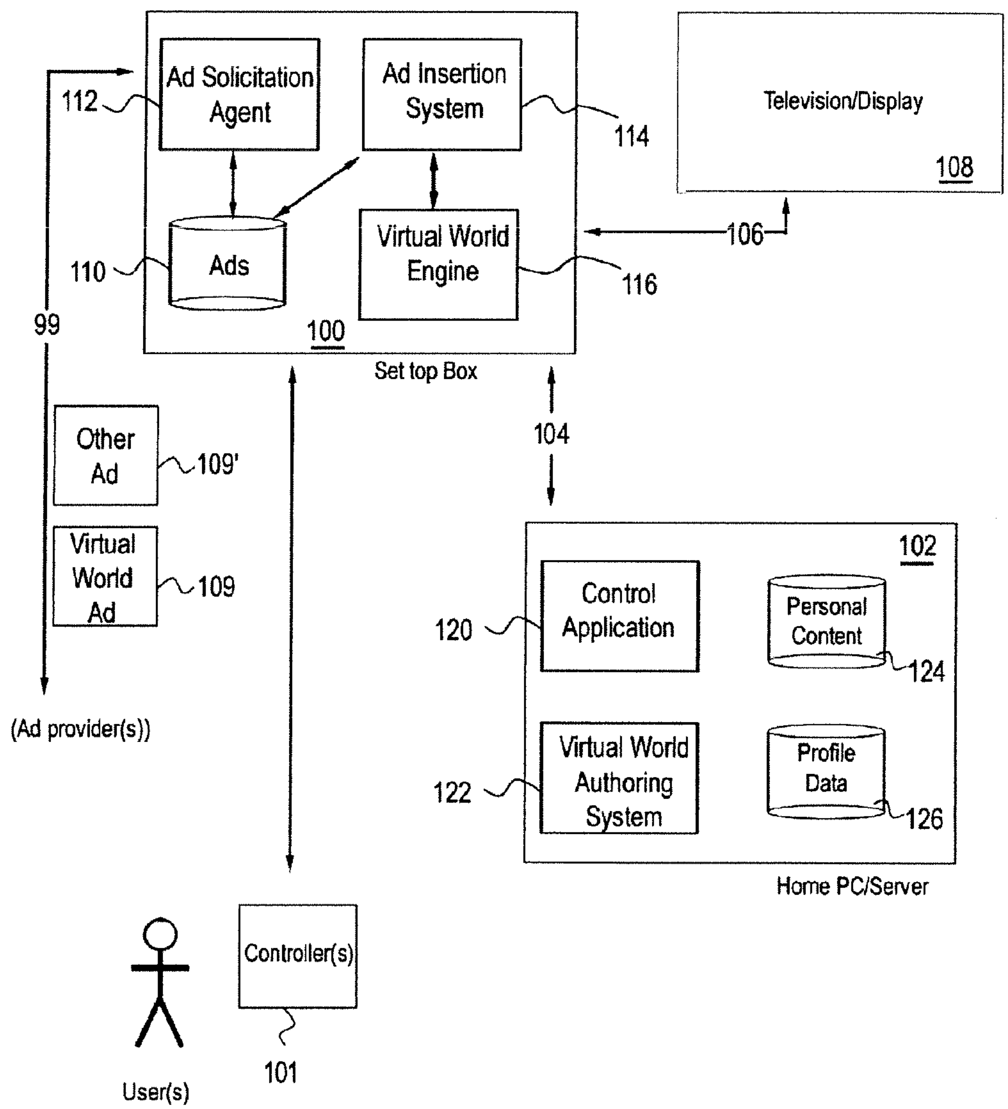
FIG. 1 is a block diagram showing components in an exemplary system for providing ads using consumer-defined context parameters.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The various computer systems discussed herein are not limited to any particular hardware architecture or configuration. Any suitable programming, scripting, or other type of language or combinations of languages may be used to implement the teachings contained herein. Embodiments of the methods and systems set forth herein may be implemented by one or more general-purpose or customized computing devices accessing software instructions rendered in a computer-readable form. Embodiments of the methods and systems set forth herein may also be implemented by hard-wired logic or other circuitry, including, but not limited to application-specific circuits. Of course, combinations of computer-executed software and hard-wired logic may be suitable, as well.

Embodiments of the methods disclosed herein may be executed by one or more suitable computing devices. Such devices may access one or more computer-readable media that embody computer-readable instructions which, when executed by at least one computer, cause the at least one computer to implement one or more embodiments of the methods disclosed herein. Furthermore, components of the presently-disclosed technology, such as ad stores, may be implemented using one or more computer-readable media.

Any suitable computer-readable medium or media may be used to implement or practice the presently-disclosed subject matter, including diskettes, drives, and other magnetic-based storage media, optical storage media, including disks (including CD-ROMS, DVD-ROMS, and variants thereof), flash, RAM, ROM, and other memory devices, and the like.

Software agents are utilized in some embodiments of the present subject matter. Generally speaking, any type of software agent may be used, with the actions of the software agent based on rules, parameters, profiles, and other data provided by the agent's principal or principals, i.e., the individual(s), group(s), or other entity (or entities) directing the agent's behavior. The degree of autonomy exercised by the agent may vary, and may depend on rules or preferences specified by the agent's principal. In some instances, the rules may provide for the agent to contact one or more persons and/or other agents for additional data, such as confirmation of a course of action or further information required by the agent to evaluate a situation. Agent functionality may be handled by a single agent or coordinated amongst multiple agents. Agent(s) may reside in one computing device or may be distributed amongst multiple computing devices.

An advertising system can comprise at least one computing device adapted to configure a shared or collaborative advertising environment for a given user, whereby the given user will be able to interact with at least one other user in the shared advertising environment. In preferred embodiments, the shared advertising environment corresponds to a virtual world environment in which at least one virtual world advertisement is executed for the collaborating users.

An advertising system and method can include various combinations of features that allow for a user (also selectively referred to herein as a consumer) to have control over certain aspects of the collaborative advertising environment. For example, users may have control over the type(s) of shared virtual world environments that can be displayed and/or the advertisements that are executed in the shared environments. In other examples, users may have control over which users participate in an interactive shared virtual world environment.

The selection of which users ultimately participate in a collaborative advertising environment can be based on a variety of parameters, including parameters that are specified by a given user who coordinates the environment. In one embodiment, a given user specifies which other users he/she wants to share a virtual world environment(s) with by creating a predetermined list of specific users. Specific users can be defined by referring to any collection of users, including individuals, organizations, business entities, intermediate nodes or a combination of such entities. In some embodiments, predetermined lists may be defined relative to contact or "buddy" lists, social network sites, or other collection of contacts, links or preferences associated with a given user. In some embodiments, users may manually select or define a list of specific users for invitation or participation.

Another exemplary option related to how a given user may specify which users they want to share a virtual world environment with involves creating a profile of preferences to which corresponding parameters associated with other users may be matched or analyzed. A given user may include any combination of one or more parameters in such a personalized profile, including but not limited to demographics, interests, location, degree of match, and others. Examples of parameters related to demographics include age, gender, income, family or marital status, sexual orientation, and others. Exemplary parameters related to location may include country, state, zip code, latitude/longitude coordinates as defined by a Global Positioning System (GPS) or other geographical identifier, or other defining parameter related to user location(s). User interests can include an infinite combination of options. For sake of example, interests may include without limitation parameters related to sports, online games, preferred stores or restaurants, travel locations, magazines or books, and any possible combination of other items identifying personal or business interests of a user.

All of the above exemplary parameters and others as will be appreciated by one of ordinary skill in the art can be defined as a specific profile criteria (e.g., only users in the state of North Carolina) or alternatively as a range of options (e.g., users with ages between 30-40) or group of options (e.g., users that are interested in one or more of baseball, hockey and soccer). In a related manner, users may choose in some embodiments to specify a particular degree of match to some selected combination of one or more parameters defined in the given user's profile. For example, a user can specify how exact a match has to be in order for the user to be included in the shared advertising environment. Thus, when other users are "matched" to a profile associated with a given user, use of the term "matched" does not necessarily require an exact correlation between the parameters in a given user's profile and those associated with other users. In contrast, other users may be merely compared, filtered or sorted based on such specified parameters and profile information. The users whose parameters are compared to selected profile parameters associated with a given user may include users already associated with the given user (e.g., users in the given user's contact lists) or users that are not specifically known to the given user (e.g., other users subscribing to a given media service provider but not specifically known by the given user).

Once an identified group of potential users is established in one or more of the above fashions or by some other alternative means of identification, a determination may be made as to which of those users is capable of executing a shared advertising environment and/or virtual world advertisement. For instance, in some embodiments, users may be required to have equipment with minimum technological capabilities to render virtual worlds or associated virtual world ads. In some embodiments, minimum system requirements may include required hardware (e.g., a specific type of set top box or interactive gaming station). In other embodiments, minimum system requirements may include required software running on some networked processing device. In still further embodiments, minimum system requirements may be related to a given user's current status (e.g., available network connection, connection speed or bandwidth, etc.)

An additional parameter that may be analyzed to determine system capability associated with users includes whether or not advertising slots associated with such users can be synchronized. In one embodiment, users must be accessing the same media content for advertisements to be synchronized among a group of users. In another embodiment, users must be operating playback devices that are capable of being synchronized at predetermined times. These predetermined times may relate to one or more advertisement presentation opportunities. For instance, a television program or on-demand movie may comprise one or more time slots for advertisements, or one or more time slots may be created by introducing breaks into a program. It should be appreciated that advertising time slots are not limited to integration with television or video media, but may be expanded to include internet, radio, music, and other applications. The examples discussed herein relative to video and television advertising are intended as an example and should not be unnecessarily limiting to embodiments of the present invention.

Once potential users are identified and system capabilities associated with such users are determined, a given user may choose to invite selected users to participate in the collaborative advertising environment. Sending and receiving invitations may be done automatically or alternatively when initiated by a user. Invited users may choose either to accept or reject an invitation to join a collaborative advertising environment. Users that accept an invitation to join are then provided with the shared advertising environment.

The shared advertising environment may be any virtual world environment, and in some embodiments is configured at least in part based on preferences associated with one or more users. For example, the virtual world environment may correspond to a baseball stadium if many of the invited users indicate a preference for baseball or sports. Alternatively, the virtual world environment may be designated by a particular user—for example, the user who originated the collaboration and sent invitations to other users. In some embodiments, a virtual world may be selected from a plurality of virtual worlds based on at least one user preference. For example, users may define different virtual worlds for different circumstances such as the type or rating of programming alongside which the advertisement will be presented, the identity of the user(s) viewing the advertisement, the advertisement type or provider, time of day, etc.

Synchronization occurs for the shared virtual world environment by ensuring that each invited user is capable of executing virtual worlds and advertisements in accordance with aspects of the disclosed technology. Similar synchronization may occur for advertisements that are to be executed by the respective collaborating users. In order for users to best interact in a collaborative environment, the same advertisement may be executed at each participating user's system.

The advertisement to be executed may be selected in a variety of fashions. In one embodiment, an ad is selected from a collection of ads associated with the given initiating user. Such ad may be selected based on preferences targeted to the initiating user or on preferences associated with one or more of the other participating members of the shared advertising environment. In one embodiment, an ad is selected that is a best match based on all members of a collaborating group. One or more advertisements may be selected for executing in a continuous (or adjacent) fashion or at different predetermined advertising time slots. For instance, the ad may be presented in and/or alongside the virtual world.

After identification of one or more advertisements for execution, an advertisement is executed within a virtual world environment. Execution may correspond to execution of an ad script, which adapts one or more computing devices to display the advertising to participating users in the shared virtual world environment. Each collaborating user may be represented within the shared environment by a respective representation, such as but not limited to a personalized avatar, character or other dimensional representation. In some embodiments, users can interact with the avatars or representations of other users and/or with an executed advertisement itself. Such interactions and other events may be coordinated using distributed gaming technologies, technology available at set top boxes respectively associated with participating users or other technologies known and used in the art.

The computing device(s) may be configured to provide programming or other content and to determine an advertisement presentation opportunity. Then, the device(s) can select at least one virtual world advertisement for presentation and access data and present a virtual world advertisement in response to the selection. For example, the computing device(s) may maintain a queue of a plurality of advertisements. In some embodiments, the queue may comprise virtual world advertisements and other, non-virtual-world advertisements (such as conventional video advertisements). Selecting may comprise choosing an advertisement from the queue based on consumer preferences and other parameters. In some embodiments, the queue may define an order for presenting advertisements and, if two virtual world advertisements follow one another, the virtual world advertisements may be presented in sequence in the shared virtual world.

In some embodiments, the device(s) may be adapted to continue rendering the virtual world after the ad script has been executed. For instance, an ad script may end once an ad has been presented. The computing device(s) may continue to render the virtual world at each participating user's system for a set or unlimited time after the end of the ad script based on user preferences and/or other considerations. For example, the virtual world may continue to be rendered while other information (such as programming) is presented to the user, such as to avoid delays associated with initializing the components used to render the virtual world. As a more particular example, a virtual world environment may be rendered for use by a group of users while all or some of the group is accessing a given media program (e.g., all are watching a sporting event such as the Super Bowl).

In other embodiments, the virtual world may continue to be rendered and presented to the user whereby the user may remain in the virtual world even after presentation of the ad is completed. As another example, an ad script may adapt the respective user device(s) to re-run the ad script (i.e. the ad may comprise a loop), with the users given the option to remain in the virtual world or depart after the ad script has completed a set number of loops. When a user remains in a virtual world for longer periods of time and/or for multiple ad iterations, a user may be entitled to receive multiple or extra incentives for their participation and viewing. In such situations where an ad script is re-run, it should be appreciated that subsequent iterations of an advertisement may correspond to different variations of a similar ad. For example, ad variations displayed in subsequent order may have different backgrounds or visual attributes, product offerings, times of execution and duration, or other parameters. This variety may help keep the interest of a user who participates in successive ads or iterations of the same or similar ads. These types of ad variations may be utilized for any ad iterations, not just ads that are played in immediately adjacent time slots. In other embodiments, the user(s) may be afforded an opportunity to opt-out of the shared advertising environment(s) at any time.

In some embodiments, an advertisement presentation opportunity may comprise an ad time slot having a predetermined length. The computing device(s) may be adapted to record the programming event if the virtual world continues to be rendered and presented to the user after the end of the time slot. For example, if a user is not already recording a program, the device(s) may be configured to buffer and/or record the portion(s) of the program the user would otherwise miss due to the user continuing to remain in the virtual world.

In other embodiments, virtual world advertisements may be provided based on data included in a programming stream. For example, video content may include embedded ad definition data or other information that directs the computing device to obtain data comprising a virtual world advertisement and present the virtual world advertisement at an appropriate time. The embedded data may define the time for presentation or the computing device(s) may determine the appropriate time to present the ad. Ads can also be delivered from an advertisement queue based on prioritization indicators and the like.

The computing device(s) may be adapted by software and/or hardware, and, of course, may be adapted to perform additional tasks and provide additional functionality. For example, the computing device(s) may comprise a television set top box, personal video recorder, gaming device, internet appliance, a media center, server, laptop, or other computer, a personal digital assistant (PDA), cellular telephone, music/video player and the like. Some or all functionality may be integrated into the television or other display(s) that provide content to the consumer(s) viewing the content.

As noted above, the system associated with each user can comprise one or more computing devices. In some embodiments, each system comprises at least a first and second computing device. The first computing device can be adapted to render the virtual world, generate the advertisement in the virtual world, and provide the virtual world advertisement to the second computing device, with the second computing device adapted to present the virtual world advertisement to a consumer. For example, the first computing device may comprise a home computer, server, or other device and the second computing device may comprise a set top box or other device used to actually present ads and content to viewers.

In some embodiments, the at least one computing device can be adapted to negotiate with at least one advertising entity, including establishing at least one contract regarding display of a virtual world advertisement to a consumer, download a data package comprising ad definition data for the virtual world advertisement, and provide an invoice to the at least one advertising entity if the virtual world advertisement is displayed in accordance with the at least one contract. For instance, negotiating may comprise participating in or conducting an auction for the exchange of advertising opportunities in return for incentives, such as payment or other rewards to the consumer.

Several examples of presenting ads in a consumer-defined context will be discussed below. Generally, in several of the examples, the advertising environments are referred to as shared or collaborative "virtual world environments" and ads are referred to as "virtual world advertisements." A "virtual world advertisement" is meant to include any advertisement wherein a virtual world is rendered and one or more advertisements are placed in and/or alongside the virtual world. Generally speaking, a virtual world (or virtual world environment) is a computer-based simulated environment that can be optionally inhabited by one or more users by way of avatars. Avatars can be representations of nearly any object or creature (real or imagined), occurring in a variety of dimensional fashions (e.g., one-, two- or three-dimensional). However, in addition to or as an alternative to avatars, a virtual world can include one or more places (such as rooms or locations), and/or other virtual world objects. For example, a virtual world may be displayed as a form of first person view into a given environment or location. In some instances, a virtual world is characterized by limitations on movement (such as gravity and topography), limitations and specifications on the interaction of objects/avatars such as behavioral rules, and/or other rules. In some embodiments, a virtual world may be rendered as an immersive environment to present a 3-D or simulated 3-D environment. As will be discussed below, in some embodiments of the present subject matter, a virtual world is rendered based on consumer preferences/parameters while the advertisement is placed in or alongside the environment subject to rules provided by the advertiser and, in some embodiments, additional data provided by or pertaining to the consumer(s) of the advertisement. Different windows or displays may be used to provide different views of one or more virtual world environments and corresponding features associated therewith.

Virtual world advertisements may be distributed in any suitable manner. In some embodiments, the virtual world advertisements are distributed alongside or instead of "traditional" advertisements such as video advertisements and interactive, but non-immersive advertisements. In some embodiments, virtual world advertisements may be distributed using embodiments of consumer-centric advertising systems discussed briefly below with regard to FIGS. 6, 7A, and 7B. However, virtual world advertisements can be distributed using any other suitable system(s), and the particular mode of distribution used in examples herein is not intended to limit the scope of the present subject matter.

Virtual world advertisements may be executed in any suitable manner including, for example, the methods described below with respect to FIGS. 1-5, respectively. In general, FIG. 1 illustrates a consumer-defined system for providing virtual world advertisements as associated with a given user. The system of FIG. 1 enables a user to define and control the playback environment for advertisements utilizing a virtual world environment. This context is described relative to user interaction at one set top box 100 associated with the given user. More particular reference to FIGS. 1-5, respectively, will be presented later.

Figure 8:
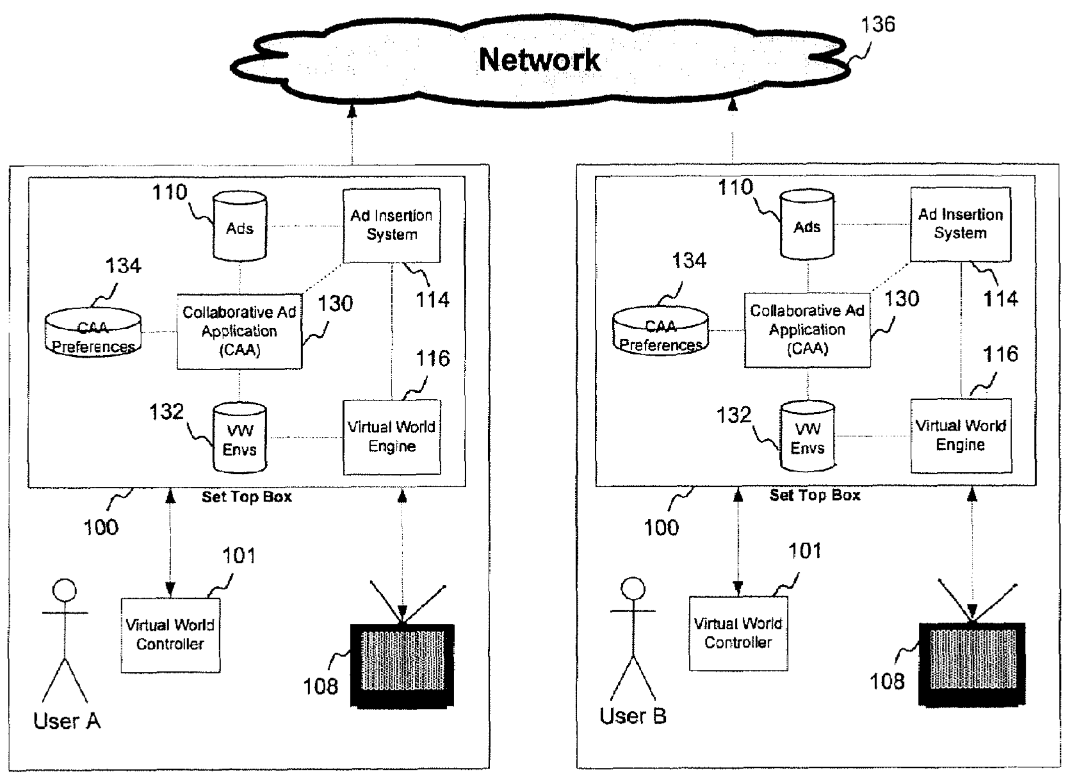
FIG. 8 is a block diagram showing components in an exemplary system for providing a collaborative advertising environment to multiple consumers.

FIG. 8 illustrates aspects of a system that extends virtual world advertising beyond the confines of a given user and affords multiple users an opportunity to collaborate and interact within a virtual world environment. User interaction within the virtual world environment is employed while advertisements (including traditional and/or virtual world advertisements) are presented. The present discussion relative to FIG. 8 is described with respect to the consumer-defined system of FIG. 1 based on set top box configurations. It should be appreciated that this is for exemplary purposes and should not unduly limit the collaborative aspects of the present technology to a set top box implementing consumer-defined advertising contexts. Any system in which multiple users may interact, such as with networked computer or gaming systems or other systems may utilize the subject technology to provide advertising in a shared virtual world environment.

With more particular reference to FIG. 8, a plurality of users may be communicatively linked together across a network 136. Network 136 may correspond to the Internet in one embodiment. Network 136 may include any one or more networks over which data may be communicated, including but not limited to a dial-in network, a local area network (LAN), wide area network (WAN), public switched telephone network (PSTN), the Internet, intranet or other type(s) of networks. Network 136 may comprise any number and/or combination of hard-wired, wireless, or other communication links. Communication among users may occur over network 136, including but not limited to communications associated with sending and receiving invitations, exchanging shared advertising environments, exchanging shared advertisements and the like. Such communications are described herein in further detail in other portions of the specification.

Multiple users may be linked via network 136, including what are referred to herein as "potential users". In some embodiments, a potential user may only become an "invited user" if that user or that user's system meets certain predetermined criteria as already discussed. Examples of such criteria include minimum system hardware and/or software configurations, actual connection over network 136, etc. Alternatively or additionally, a user may be required to have certain parameters matching another user's given profile in order to be an "invited user". In some embodiments, users may also be described as "participating users" if they are potential users that have been invited to join a shared advertising environment and then further accept an invitation to join and/or do in fact join the environment.

It should be appreciated that any number of users may be included in the various groups of potential, invited and/or participating users as briefly described above. For ease of illustration, only two users are shown as networked in FIG. 8. These users are respectively designated as User A and User B. Users A and B are each associated with a respective system that generally includes such elements as a controller 101, a display 108 and a set top box 100. Other system components (though not illustrated in FIG. 8) may also be provided, including but not limited to other components illustrated in FIG. 1.

Virtual world controller 101 represents any suitable hardware component or components that a consumer (or multiple consumers) can use to interact with a virtual world environment and/or advertisement. For instance, controller 101 may comprise a remote control for set top box 100, an interface device such as a mouse or tablet, or a game controller of any suitable type including but not limited to a television set top box, personal video recorder, gaming device, internet appliance, a media center, server, laptop, or other computer, a personal digital assistant (PDA), cellular telephone, music/video player and the like. The amount of interaction/control that may be exercised generally will depend on the capabilities of a given consumer's system, ad content and virtual world parameters, and the desire of the consumer to interact with, explore, or otherwise utilize the virtual world environment(s).

Display 108 may comprise any suitable display such as a conventional or high-definition television, flat panel display, projection display, computer monitor, LCD, or any other suitable display system of various type, resolution or capability which may or may not include audio capabilities. Set top box 100 may comprise any suitable computing device or devices that can be configured to select and provide video content such as television programming, advertisements, electronic programming guides, and the like. For instance, set top box 100 may comprise a cable box, personal video recorder, internet or media appliance, or media player.

As shown in FIG. 8, each set top box 100 associated with respective Users A and B comprises several components that are used to generate and present virtual world advertisements in a shared virtual world environment. In this example, each set top box 100 includes an ad store 110, ad insertion system 114, virtual world engine 116, collaborative advertisement application (CAA) 130, virtual world environment store 132 and CAA preference store 134. Additional elements may also be provided at the system associated with respective users. Examples of such additional elements include but are not limited to those illustrated in FIG. 1, such as an ad solicitation agent, a control application, a virtual world authoring system, other databases, etc. Such additional exemplary features will be discussed in detail with later reference to FIG. 1.

Referring still to FIG. 8, several data stores 110, 132 and 134 are associated with each user. Each store may correspond to one or more portions of computer-readable media provided locally at the user's system or readily accessible by the user. In some embodiments, each store may comprise multiple stores, such as a hard drive or other suitable area for mid- to long-term storage and one or more buffers or queues for more immediate storage and retrieval of user preferences, advertising content and/or related data. In some embodiments, selected ones of the multiple stores 110, 132 and 134 illustrated in FIG. 8 are actually combined into a single data store accessible by a given user. Stores may alternatively be provided in a central location and accessible by multiple users. Ad store 110 corresponds to a data storage location for locally downloading received advertisements. Ads may be received in various embodiments based on consumer negotiations with a third party advertising entity, selection in accordance with matching to a group of collaborating users, or other options. Store 134 corresponds to a data storage location for locally downloading virtual world environments in which a given user desires to participate. For example, once potential users accept an invitation to collaborate with other users in a shared advertising environment, such users are provided access to a given virtual world environment and store 134 is where each user may locally store a copy of such environment. Store 136 corresponds to a data store location for storing various user preferences associated with configuration and implementation of the subject collaborative advertising application. For example, store 136 may be configured to store a user profile and/or list of contacts for determining which users to invite into a collaborative advertising environment, user invitation and participation preferences, and the like.

Virtual world engine 116 comprises any suitable hardware/software which, based on input parameters, can be used to render an immersive virtual environment. Virtual worlds are known for use in several different areas, such as gaming and simulations. Any suitable virtual world can be rendered and any suitable engine(s) can be used to render the world(s). Generally speaking, the virtual world will be defined by parameters that specify movement rules, permitted conduct and objects, and other constraints on activity therein. As is known, a virtual world can support various virtual entities such as avatars and objects therein. Any suitable activities can occur in a virtual world pursuant to the parameters defining the world. For advertising purposes, this can include, for example, display of a logo or graphics (2-D or 3-D), video and audio clips, interactive avatars or other objects, and the like.

Ad insertion system 114 represents software and/or hardware configured to obtain ad definition data and insert advertising content into the virtual world. For instance, ad definition data may specify the nature and extent of advertisements to be inserted into the virtual world. Ad insertion system 114 can provide commands to virtual world engine 116 so that the specified content and other activities occur in the virtual world pursuant to the ad definition data and user parameters. Advertising content may be provided in any number of ways. For example, advertising content may be inserted into the fully-rendered virtual world environment, may be included as part of rendering the environment itself, and/or may be presented alongside the virtual world. In this example, ad insertion system 114 further sends playback/mixing signals so that display 108 changes from displaying content to displaying the rendered virtual world advertisement. For instance, ad insertion system 114 may detect or create a commercial break in programming content and switch audio/video playback from the programming content to a view of the virtual world rendered using engine 116 with advertisement(s) therein. As will be discussed later below, in some embodiments and at some times, system 114 may display the rendered virtual world even after an advertisement has been presented.

Collaborative advertisement application (CAA) 130 represents software and/or hardware configured to coordinate aspects of the present technology including those process steps discussed with reference to FIGS. 9-11, respectively. Examples of such steps include, but are not limited to managing contact lists, profiles and user preferences, determining a set of potential users for invitation or participation in a shared advertising environment, sending and replying to invitations, coordinating the ad insertion system 114, synchronizing shared virtual world environments and advertisements, and others.

Figure 9:
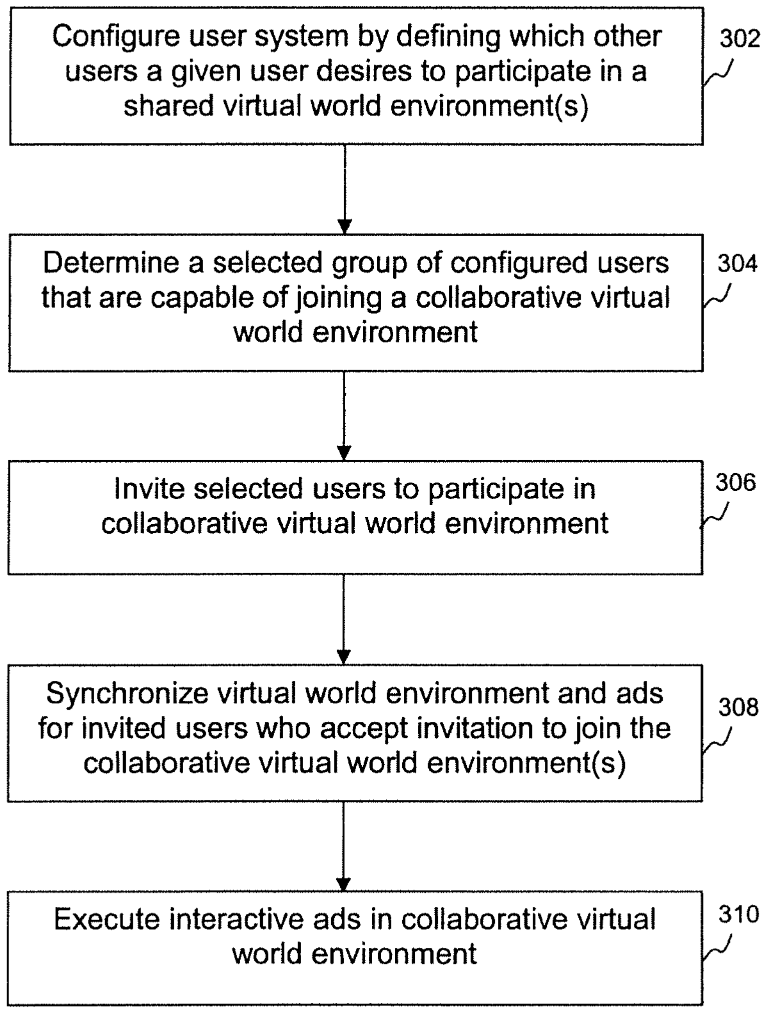
FIG. 9 is a flowchart showing steps in an exemplary process for providing a collaborative consumer-controlled advertising environment.

Referring now to FIG. 9, exemplary steps as may be implemented by CAA 130 or associated portions of a given user's system will now be discussed. A first exemplary step 302 involves configuring a user's system by defining which other users a given user desires to participate in a shared (or collaborative) virtual world environment(s). As previously described, such system configuration step 302 may involve steps taken by a user to define one or more lists of specific users for sharing a virtual world environment. In one embodiment, such list of users may correspond to a preconfigured buddy list, social network, list of e-mail contacts, etc. Additionally or alternatively, a given user creates a profile to which parameters associated with other networked users can be compared for selection. User preferences including profile preferences (e.g., demographics, interests, location, degree of match, and the like), invitation preferences and participation preferences may be stored in CAA Preferences store 134 as illustrated in FIG. 8. Exemplary user profile preferences have already been discussed. In one embodiment, invitation preferences may include designations regarding whether to automatically accept or reject invitations based on a given user, user profile or other parameters. How a given user's system treats invitations may then be implemented in accordance with selected defined invitation preferences. Exemplary user participation preferences may include designations defining when a given user wants to participate in a collaborative environment. In one example, such participation preferences are defined in terms of timeframes (e.g., one or more range of dates and/or specific times) for desired participation, programming genres within which participation is desired (e.g., only during sports shows), users with which participation is desired (only users on a contact list), etc. In one example, metadata associated with advertising or associated media content may drive the participation preferences, such as whether to accept or reject an invitation. In some embodiments, the users that are selected in accordance with the above system configuration process are referred to herein as "potential users".

A second step 304 associated with the method of FIG. 9 involves determining which of the potential users configured in step 302 are capable of joining a collaborative virtual world environment. A third step 306 involves inviting selected users to participate in a collaborative virtual world environment. Invitations can be sent out to users via any available network not limited to cable television, telephone, satellite, cellular phone or others. Step 308 involves synchronizing virtual world environments and one or more advertisements for invited users who accept the invitation to join one or more collaborative virtual world environments. Interactive advertisements are then executed in the collaborative virtual world environment in step 310. In some embodiments, invitations and/or synchronization can occur based on which users are logged on to one or more networks. Such user status information may be obtained from presence info on a cable or media provider network or from a third party tracking or monitoring service. More particular aspects of steps 304, 306 and 308 will now be discussed with reference to FIG. 10.

Figure 10:
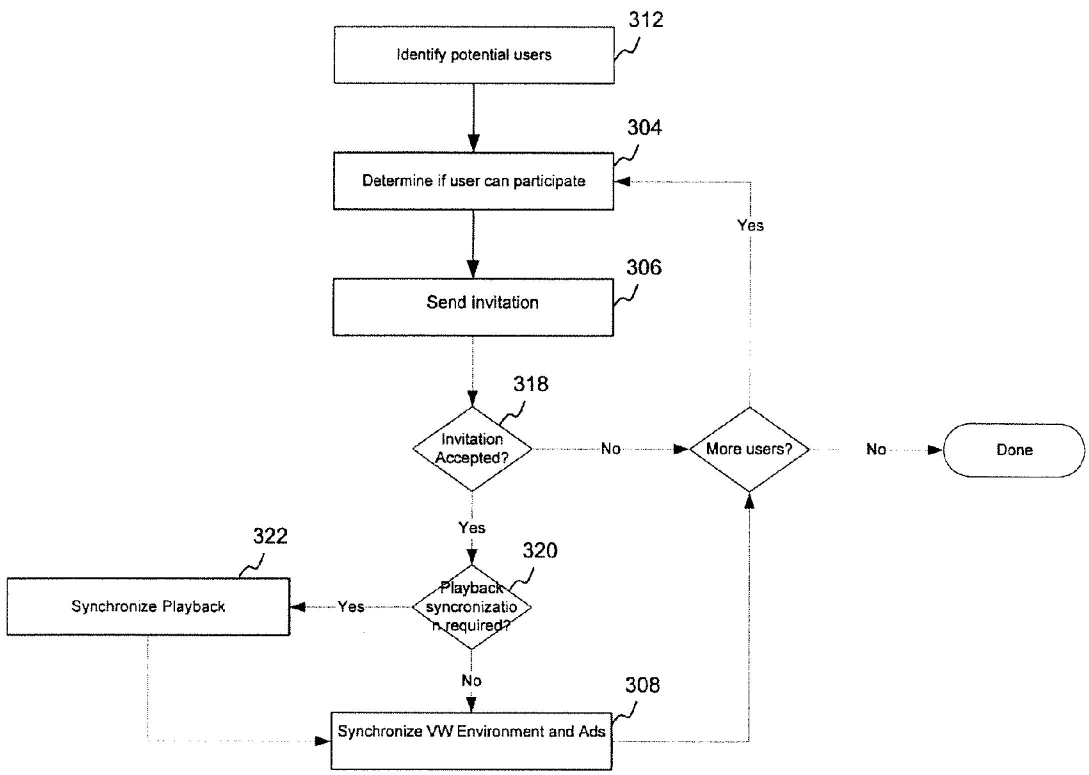
FIG. 10 is a flowchart showing more particular aspects of the process shown in FIG. 9, particularly related to the steps of determining a select group of users, inviting those users to participate in a collaborative consumer-controlled advertising environment, and synchronizing playback among participating users.
Figure 11:
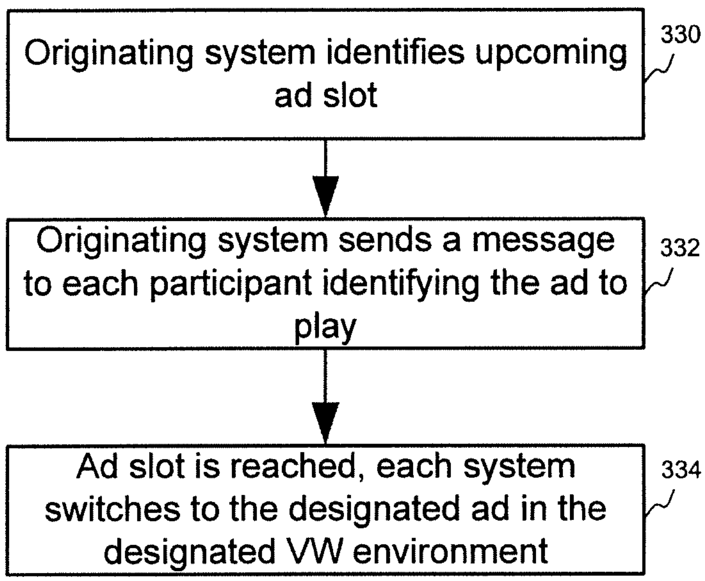
FIG. 11 is a flowchart showing more particular aspects of the process shown in FIG. 9, particularly related to the steps of executing interactive ads in a collaborative advertising environment.

Referring now to FIG. 10, steps must be taken to identify and coordinate a set of potential and ultimately participating users in order to create a collaborative advertising environment. If a user has preconfigured a set of users, this set is used to identify potential users. If a user has preconfigured a profile for comparison to parameters associated with other users, thus selecting other users, then the user's system compares the user profile definition with all other registered users in the subject system. All matches are now identified as "potential users" for the collaboration in accordance with step 312.

Once potential users are identified in step 312, a determination is made in step 304 regarding whether a user has system capabilities allowing the user to participate in a shared virtual world environment. In some embodiments, users may be required to have equipment with minimum technological capabilities (e.g., specific hardware and/or software options) to render virtual worlds or associated virtual world ads. In some embodiments, user systems might need to be capable of synchronizing ad slots with other users. For example, users may need to access the same media content for advertisements to be synchronized among a group of users. In another embodiment, users must be operating playback devices that are capable of being synchronized at predetermined times. These predetermined times may relate to one or more advertisement presentation opportunities. For instance, a television program or on-demand movie may comprise one or more time slots for advertisements, or one or more time slots may be created by introducing breaks into a program. Time-based aspects of user synchronization do not necessarily require that users execute virtual world environments and/or related advertisements at precisely the same time. In some embodiments, it may be desirable to merely have some amount (any amount or at least some predetermined amount) of time overlap among user execution.

One example of how a user capability determination is made in accordance with step 304 includes sending a message to respective systems associated with other users to determine if such systems are properly connected, functioning and accepting requests for participation in a collaborative virtual world environment. If the message is successful, then an invitation, or "collaboration request" message, is sent in step 306 to one or more selected users having verified capabilities. Such an invitation may correspond to a communication request for information from the invited user. Invitations may request such exemplary information as unique system identifier(s), user identifier(s), user profile(s) or other preference-related parameters associated with each user, system metadata (e.g., metadata associated with available digital content, media programs, available advertisements and/or virtual world environments, etc.), upcoming ad slot definition data, and other pertinent information.

In another exemplary embodiment of step 306, a computing device associated with a given user (i.e., a sending system) will compare that given user's ad slot definition(s) with those of other users (i.e., receiving system(s)) to determine if synchronization among user ad slots is possible. Synchronization of ads in a virtual world environment enables users to better interact with one another at the same or relatively proximate time and under the same or similar conditions. If another user's system is not capable of joining a collaborative virtual world environment for any of the above reasons, a message may be sent to the sending user's system and the "invitation" sent in step 306 is rejected. If a receiving system is capable of joining, it either formally accepts or rejects the invitation. Based on the information in the message and the receiving user's profile, an automated answer may be generated and sent back to the sending system. Alternatively, the sending system can prompt the requesting system's user to manually accept or reject the invitation. Such manual acceptance may occur, for example, by way of mouse click, keyboard selection, voice command recognition or other selection mechanisms as are known in the art. This prompt can be on the primary display 108 associated with such user(s) via an Open Cable Application Platform (OCAP) or similar interface or the prompt can be displayed on a secondary display device available to the requesting user. If a user is accepted in step 318, then the process of FIG. 10 proceeds to step 320, where a subsequent determination is made regarding whether playback synchronization is required. If break synchronization is required because ad times are slightly different at different users' computers, then break synchronization is initiated at step 322. It should be appreciated that a user may still rescind at any time from participation in a virtual world environment in accordance with the present technology even after having accepted an invitation.

In another embodiment of the present technology, a given initiating user's system may be provided with a list of other users that are capable of participating. The given user may then intervene and manually select which of those capable potential users are actually sent an invitation. In such embodiment, messages may be sent out as before, but collaboration is divided into two portions respectively related to compatibility and invitation. First, a compatibility message is sent to determine which systems are capable of collaborating. From the list of capable users, a given user then selects which users to send an invitation portion of the message.

In a still further embodiment, user systems may allow for overlapping time slots. In other words, ad breaks from media content need not be precisely synchronized. Instead, the collaborating system(s) can allow for a configurable overlap time period, thus providing more potential collaboration for users watching different shows or for unsynchronized systems. It should be appreciated that configuring such an overlap time should involve a consideration of interaction opportunities such that an appropriate overlap time is selected. In some embodiments, an overlap time slot that is too wide may introduce problems with providing truly interactive collaboration. More particularly, one user may see an advertisement well before another user, or users may try and collaborate with other user(s) who have already left an advertisement or shared environment.

Referring still to FIGS. 9 and 10, a subsequent exemplary step 308 related to synchronization of virtual environments and/or advertisements involves users having access to the same virtual world environment and associated content, including but not limited to advertising. If shared virtual world environments are executed locally, each user should have access to the environment. The present system may utilize mechanisms for distributing the virtual world environment(s) to each requiring participant in an optimal fashion. In one embodiment, distribution can occur in a peer-to-peer (P2P) manner using a distribution program such as BitTorrent™ or the like. Alternatively, the environment can be copied directly from the sending user or from a centralized distribution server or other designated system node. Once data defining such a virtual world environment is received locally at a user's system, it can be stored in data store 132 (as illustrated in FIG. 8).

The advertisements that are played within or alongside a virtual world environment may be virtual world advertisements and/or traditional advertisements. Additional discussion of the execution of virtual world advertisements will be discussed later herein. In either case, the present technology synchronizes advertisements that are played within a given virtual world environment, thus allowing users to collaborate around the ads. To synchronize the targeted ads, an "inventory" of ads from a sending user may be utilized. In one embodiment, an ad is selected from this inventory that best matches the profiles of all invited users choosing to participate in the collaborative virtual world environment. Alternatively, an inventory of ads is taken from one or more of the other users' systems and searched for a best match based on user profile parameters. Other decision-making options for recommending ads targeted to a group of multiple users may be employed. Matching advertisements are then synchronized to the participating users in a manner similar to the virtual world environment synchronization discussed above.

Referring now to step 310 of FIG. 9, the selected ads are then executed within the virtual world at the system associated with each collaborating participant. More particular exemplary aspects of such execution are illustrated in FIG. 11. Once step 310 is reached, each participating user should have access to, locally or otherwise, the shared virtual world environment and a number of advertisements. The user who originated the collaboration drives the exemplary execution outlined in FIG. 11. An advertisement opportunity (e.g., an ad time slot) associated with the originating user's system is determined in step 330. As the originating user's system approaches an ad time slot, a message is sent in step 332 to each participating user's system indicating the ad to be played. As each system arrives at the ad time slot, the respective user's system switches to the virtual world environment and plays the identified ad in step 334. More particular aspects related to launching of the virtual world environment will be discussed later herein. In alternative embodiments, an ad plan can be distributed to each participating user at the beginning of the ad execution process. The ad plan may contain a predetermined list of ads to play, and each system then simply plays the next ad on the list when the next ad slot approaches.

Additional options related to the above-described process will now be addressed. In one embodiment, the virtual world environment rendered at each participating user's system may persist and continue to be rendered between ad playbacks to enable continuous collaboration among participants. This affords less lag time between adjacent executions of virtual world environments and advertisements. It also allows interaction among users in a given collaborative virtual world environment (e.g., interaction among avatars) even with advertisements are not being executed.

In some embodiments, options are provided that enable any participating user to opt-out of one or more collaboration sessions. Opting out or other decisions regarding participation can be established in user preferences. For example, a given user can input preferences related to any current session defining a collection of users with which the given user does or does not want to collaborate with, environments in which the given user does or does not want to participate or others. Opt-out decisions by a user may be implemented automatically based on such user preferences or prompts as may be made available to a user offering the user an opportunity to manually opt-out of the virtual world environment(s) at any time.

Additional embodiments of the subject collaboration technology provide opportunities for users to select among multiple ad environments. The exemplary embodiments described above focus on user acceptance of one collaborative environment at a time. In other embodiments, collaboration invitations can be queued on a user's system. The CAA application may then present the user with possible virtual world environments the user can join. This would enable the user not only to select among a plurality of possible environments, but also to switch between environments at various points in time. To enable such functionality, a given user's system may accept multiple invitations to collaborate, but only joins selected collaborative sessions when requested by a sending user. As part of the presentation to the user regarding the possible environments to join, a system can present such identifiers as the users currently invited or already participating in a given environment(s), the owner/initiator of the environment(s), environment description and metadata, and other information that may aid a user in his decision regarding which of multiple environments to join. In other embodiments, multiple virtual world environments can be selected for a given user at the same or different times on the same device by using a split-screen display or multiple displays. Still further, different devices associated with a single user or group of users may simultaneously execute different virtual worlds.

In still further embodiments, ads are presented to participating users in the virtual world environment in a broadcast fashion (as opposed to narrowcasting ads to a specific list of recipients.) In such embodiments, the system does not have to select and distribute an ad to all participants. Each participant is presented the actual broadcast ad. When the virtual world advertisement is contained in the broadcast, each system merely plays the broadcast ad into the virtual world environment that is shared by participants. In accordance with broadcast ads, each user may see an ad that is tailored to their individual preferences. Such customization to user preferences is a feature that will be discussed herein in more detail below.

A particular use case example of how aspects of the presently discussed collaborative virtual world advertising environment may be implemented will now be presented. For example, consider a plurality of users each having a set top box or similar system enabling such users to be networked to one another, have access to the same type of media content, and have capability to view virtual world environments and advertisements. In one embodiment, the users may configure their systems to specifically share virtual world environments for advertising among the group.

Some or all of a group of users may happen to be watching a given media program at the same time—consider if all users are watching the Super Bowl or other major sporting event at the same time. One of the user's systems (e.g., an initiating user) identifies the availability of virtual world ads in its advertisement queue and so the system attempts to establish a group of other users that may participate in a collaborative experience to view such virtual world ads or others.

In order to establish a group of collaborating users, the initiating user's system determines a list of potential users. Such a list may correspond in one embodiment to a group of all users that are networked to the initiating user and who also happen to be watching the Super Bowl. An invitation is sent to one or more of these potential users to participate in a collaborative ad environment. The invited users' respective systems either manually or automatically accept or reject the invitation. For each accepted invitation, a determination is made ensuring that the corresponding users' systems have the same virtual world environment. The participating systems then collaborate to identify and distribute virtual world ads to be presented in one or more virtual world environments. Collaboration for identifying which virtual world environment(s) and advertisement(s) to execute may occur in a variety of manners. In one example, invited users are polled with an selectable option sent on the invitation to designate or rank which of multiple choices each user would like. Invited users may also view proposed ads or environments and make alternative or additional suggestions based on initial proposals.

When the first available advertisement opportunity (e.g., time slot) arrives, each participating user is placed into the selected virtual world environment(s) for the duration of the ad (as long as the user(s) don't choose to opt-out of the environment or ads). In one embodiment, the same advertisement and virtual world script executes in each of the participating users' local virtual world environments. Each user's avatar is present in the shared virtual world environment and the participating users can interact with one another and/or with the executed advertisement(s). The state of the shared virtual world may be persisted throughout the entire Super Bowl or other designated media programs so that participating users can continue to interact from one advertisement to the next.

Reference will now be directed to the exemplary system of FIG. 1, in which aspects associated with execution of a virtual world advertisement in an individual consumer's system will be discussed. Many of the components of FIG. 1 have already been discussed with reference to FIG. 8, but additional features are now presented.

Referring to FIG. 1, consumer ad solicitation agent 112 may comprise one or more software agents or routines adapted to contact advertising entities and obtain ad definition data. For instance, as will be discussed below, agent 112 may participate in or conduct auctions where consumer ad time is exchanged for incentives from advertising entities. In some embodiments, some of the resulting advertisements may be "traditional" (e.g. video or non-immersive interactive ads) while other advertisements are virtual world advertisements. Thus, the ad solicitation agent 112 may be adapted to consider the benefits associated with virtual world advertisements along with any applicable limitations. For example, a vendor or other advertising entity may provide for a greater incentive for the presentation of its advertising content as part of a virtual world advertisement, but the content may have certain hardware requirements, such as minimum required graphics capabilities that must be met for the consumer to receive credit for viewing the ad. In another example, a vendor or advertising entity may provide for a greater incentive based on an increased number of users participating in a shared virtual world environment at the time the advertisement is executed. Therefore, the ad solicitation agent 112 can be configured to take such considerations into account when choosing ads and negotiating for display of ads. Once ad solicitation agent 112 has successfully negotiated for the display of one or more ads, the ads may be downloaded for local storage and later retrieval in ad stores 100 associated with various respective user systems.

Set top box 100 may be connected to content providers and ad vendors (via outside network(s) 99), display 108 (via connections 106), and home PC/server 102 (via network 104). Any or all of networks/connections 99, 104, and 106 may comprise multiple networks, and any or all of the networks may be combined. For instance, display 108 and home PC/server 102 may both be connected to set top box 100 via a home network 104. Any component may be connected to one or more outside networks such as 99. For instance, in some embodiments, network 99 may comprise the Internet, which may be used for delivery of advertisements and/or programming content. In other embodiments, advertisements and/or programming content may be delivered via other networks, such as through a cable television system, telephone system, or satellite system, for example. All of the components may be connected to one another via home network 104, the internet, and/or other outside networks.

Functionality provided by set top box 100, home PC/server 102, and display 108 may be provided by more or fewer devices than are shown in the example of FIG. 1. For instance, set top box functionality and display functionality may be integrated into a single unit. Similarly, some or all functionality provided by home PC/Server 102 may be combined with that of set top box 100. For example, a media PC or appliance may provide set top box functions and PC functions. Thus, it will be appreciated that the configuration shown in FIG. 1 is for purposes of example only.

Home PC/server 102 may comprise any suitable type and number of computing device(s), such as a desktop, laptop, or server computer of any architecture using any operating system. Computing device 102 (shown in this example as PC/Server 102) comprises one or more suitable devices that can be used in support of the virtual world environments and advertisements in some embodiments. For instance, device 102 may include storage of personal content 124 and personal profile data 126 which may be used to determine which virtual world(s) to utilize, how to render advertisements, and which virtual world advertisements should be solicited by the system. For example, the consumer may provide preferences and other parameters controlling operation of the system using control application 120. As with the other functionality provided by device 102 in this example, control application 120 may be provided using set top box 100 in other embodiments. Virtual world authoring system 122 may represent any suitable application or groups of applications that can be used by consumers to construct and define virtual worlds. Authoring system 122 may, for example, comprise any world creation tool or tools such as AJAX3D, DIVERSE, Multiverse, and the like. In some embodiments, consumers may access templates or fully-defined virtual world environments. For instance, users may generate and share environments or purchase environments from third-party providers. As another example, system 122 may comprise one or more virtual world authoring tools adapted to construct or modify gaming environments.

In some embodiments of the present subject matter, the advertising consumer provides various parameters, such as preferred virtual environments, conditions for virtual world selection, and profiling data, which are used to customize the context in which advertisements are presented. For instance, rather than being force-fed advertisements, the consumer is provided an additional level of control since the advertisements are presented in the consumer-defined context. Simultaneously, however, the advertising content is subject to rules and restrictions provided by the advertising entity so that the message of the ad is not lost.

For example, a consumer may be watching television programming alone and configure the system to deliver all ads in a virtual re-creation of Fenway Park baseball stadium. For example, the baseball stadium environment can be rendered using a third party gaming system or gaming engine included as part of set top box 100. As the consumer watches the ad, memorable plays can be re-enacted in the virtual world while the ad is displayed therein. For example, the ad may be displayed in conjunction with the virtual world, such as an ad presented alongside the virtual world (such as a picture-in-picture). As another example, the ad may be incorporated into the virtual world, such as presented in the stadium on a simulated jumbo screen or on a blimp visible above the stadium. As another example, the consumer may configure the system so that, when the consumer and the consumer's spouse are watching television together, ads are presented on a virtual TV in a simulated beach environment where avatars representing the consumer and spouse are relaxing. However, these examples are not intended to be limiting. For instance, other avatars or objects could be defined in the ad and interact with the viewers.

In other embodiments of the present technology, such as when multiple users are participating in a shared virtual world environment, the environment may be selected in a variety of fashions. In one example, the virtual world environment can be selected by the user who initiates the collaboration among multiple users. In another example, the environment is selected or configured based on parameters associated with some or all of the invited or participating users. For instance, a Fenway Park interactive environment may be utilized if a majority of the participating users are indicated as having an interest in sports or baseball. In still further embodiments, multiple users may be respectively shown environments that are different and tailored for the particular users. For instance, a shared virtual world environment may generally be selected as a baseball stadium, but the stadium is provided as Fenway Park for Boston Red Sox fans, Yankee Stadium for New York Yankee fans, Turner Field for Atlanta Braves fans, etc.

In some embodiments, virtual world advertisements can be defined using one or more digital files that comprise content for the virtual world ads. For instance, the file(s) may comprise a package that is handled within advertising negotiation and distribution systems in a manner similar to how such systems handle other, non-virtual-world ads (such as video ads). For example, the package may comprise one or more XML files that define the ad, along with one or more vendor supplied content items such as videos, graphics, and the like. Within the XML file, scripts may be utilized to define the various components, interactions, rules, and other advertisement parameters. The scripting language or format may be dependent on the type of virtual world engine that is used. For instance, one or more standards may be defined for the XML format for advertisers to abide by in construction of advertising packages. Advertisers may construct packages in any suitable manner, for example using authoring applications and/or manual construction.

The table below provides an exemplary XML file for a hypothetical virtual world ad provided to advertise a hypothetical cola ("SuperSoda"). However, any structured format can be used to define the ad. In this example, one of two possible video ads is played within the virtual environment depending on how many people are in the room. Additionally, an avatar, configured by the user, is utilized to introduce the ad. For example, the user may provide various avatars for use in virtual world ads that require the use of an avatar. For instance, a user may define an avatar based on him/herself or another avatar, such as a fanciful creature. The user-defined avatar can be selected and then acts according to the ad specifications.

TABLE 1

Hypothetical Virtual World Ad Definition File

```
    <CAPS-Advertisement>
<Header>
    <Vendor = "SuperSodaCo"/>
    <Ad Id = "123456"/>
</Header>
<Attachments>
```

TABLE 1-continued

Hypothetical Virtual World Ad Definition File

```
    <ID="ab123" type="graphic" name="soda.gif"/>
    <ID="abc88" type="video" name="ad1.m2p"/>
<ID="abc89" type="video" name="ad2.m2p"/>
</Attachments>
<script>
    <!-- The scripting syntax varies based on the supporting
    virtual world -->
    avatar1 = load_avatar(from_user, male, 0,0);
    avatar1.say("Hello", username, pause, "have you had a SuperSoda
    lately?");
    if (num_users == 1) {
        play_video("abc188", video_slot1);
    }
    else {
        play_video("abc189", video_slot1);
    }
</script>
</CAPS-Advertisement>
```

Consumer ad solicitation agent 112 can utilize any suitable method or methods to identify and select ads. For instance, in some embodiments, an auction-based system can be utilized whereby the user defines preferences and/or profiles from which an auction agent or agents engage in negotiations to obtain and use the "best" ads. For example, the auction agent(s) may be configured to give higher value to virtual world ads, especially those in which multiple users are interacting and viewing the ads, and the preference may override other preferences such as economic value. Additionally, as noted above, ad definition data may depend on particular rendering engines and other specific functionality. For example, if the virtual world engine is included in a set top box, then the particular virtual world engine implementation may vary across set top box manufacturers. Therefore, consumer auction agents may be configured to validate ads to ensure the ads are compliant with the components of the system such as virtual world engine 116 and insertion system 114.

In some embodiments, each virtual world environment created/selected by a consumer may be associated with a profile. The profile can be used to define when the virtual environment should be utilized in a virtual world advertisement. For instance, in the example above, the Fenway Park environment was used when the consumer was alone but the beach environment was used when the consumer's spouse was also present. Other parameters which may be used in selecting the environment include, but are not limited to: identity and/or number of viewers, time of day, date/season, genre of programming content, and rating or other content metadata associated with the programming content.

Figure 2:
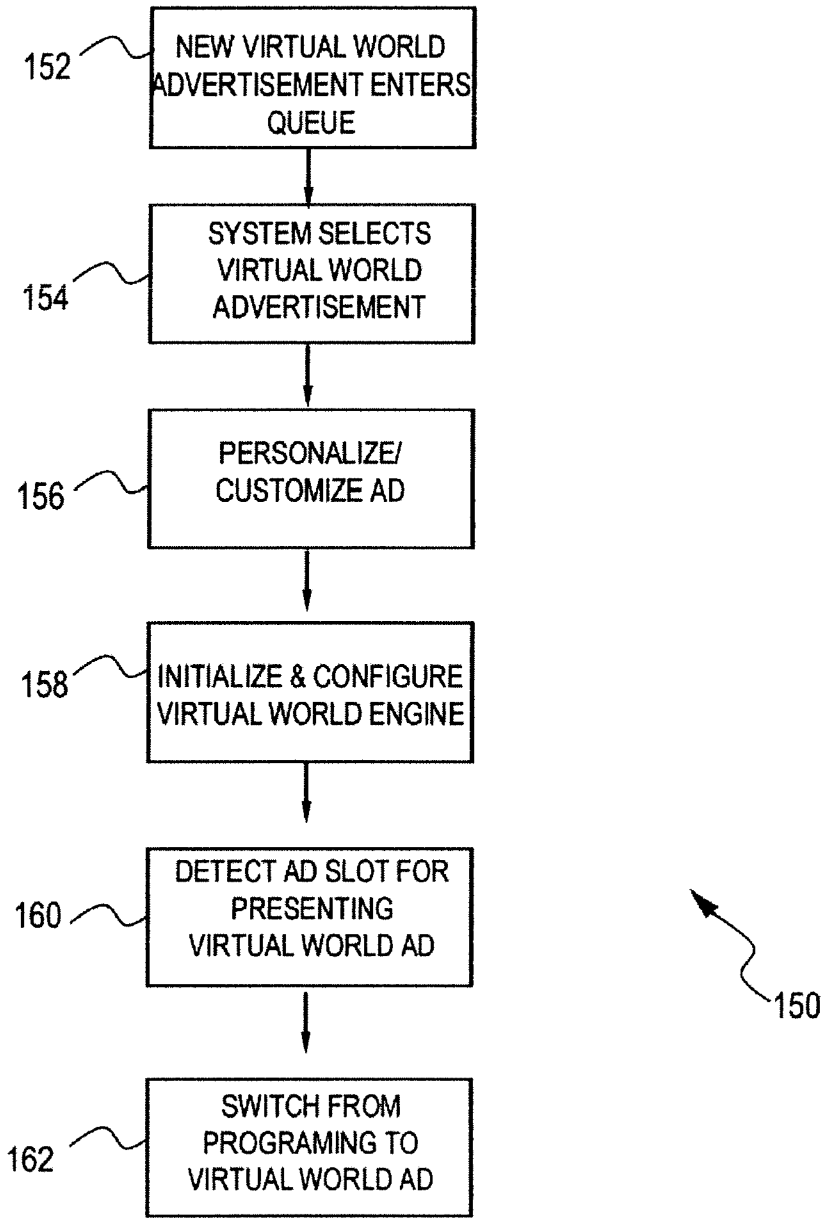
FIG. 2 is a flowchart showing steps in an exemplary process for presenting a virtual world advertisement.

When virtual world advertisements are to be provided, in some embodiments, buffering is preferably used so that the system is ready to invoke the virtual environment and display the advertisement(s) at the proper time. For instance, buffering may be provided in conjunction with management of an ad queue. Turning to FIG. 2, an exemplary process 150 for preparing for display of a virtual world advertisement is shown. At step 152, a new virtual world ad enters the ad queue. For instance, a consumer auction agent may have successfully negotiated for display of an ad and the ad is downloaded to set top box 100. The size of the queue(s) or other buffer(s) can vary and may be configurable. Eventually, a late binding agent or other component responsible for queue management may determine a time for presentation of an ad and, since in this example a virtual world advertisement is available, the virtual world advertisement is selected for display. Then, at step 154, a virtual world is selected for use. For instance, as noted above, a consumer may define multiple environments for different circumstances.

At step 156, the ad is personalized/customized. For example, as noted above, the content of the ad may vary according to the circumstances of presentation, such as a different video based on the number of users. However, the amount and extent of customization can be more varied. For instance, ad definition data may comprise data defining user-specific rules, actions, and content that augments or alters the virtual environment and/or objects therein. For example, an ad script may include one or more queries or require inputs to custom-tailor advertising content to a particular consumer or consumers. The ad script may request information, such as the user's name, age, and demographic information. In some embodiments, the request(s) may be provided as one or more queries and one or more computing devices comprising the ad delivery system (such as the set top box) may be configured to automatically respond to such queries. The queries may be simple or complex. For example, if the consumer maintains a local store of profiling data, for example via PC/server 102 or other suitable device(s), then certain ad scripts may query the profiling data for more detailed information. In some embodiments, ad scripts can directly query profiling data, while in other embodiments the query or queries are provided indirectly.

In some embodiments, ad personalization and other setup aspects are preferably timed to reduce or avoid lag between the time that an ad presentation opportunity begins and the time that an ad starts. However, in some instances, some or all aspects of personalization (and/or other aspects of setting up an ad) do not occur until the ad is actually played back or shortly beforehand, since in some cases the actual identity or identities of viewers may be uncertain until playback time. For example, if ads are set up/personalized too early, such as when the ad first arrives in the queue (or otherwise arrives at the system), the personalization/setup may be based on data that becomes stale between the time of personalization/setup and playback. Thus, in some embodiments, the system may balance the need for recency in data against the need to avoid lag in playback.

At step 158, the virtual world engine is initialized and/or configured for presentation of the ad. For instance, hardware and/or software components may be used to render the virtual world and present the ad content therein. In some embodiments, the underlying hardware and/or software routines for presenting the virtual world may be fully or partially initialized in advance of ad presentation. For example, if a game system or other specialized hardware is used to present the virtual world, the hardware may remain active even after a virtual world ad is finished or may only be partially shutdown (e.g. standby). As another example, software modules or components used to render the virtual world may remain resident in memory for quick re-initialization rather than being fully loaded and initialized for each ad.

At step 160, the time for presenting the ad actually arrives. The time between initial preparation of an ad and the time of actual playback can depend on factors such as system capabilities (such as memory and processing power) as compared to the complexity of the virtual world ad to be displayed. At step 162, the system switches video output to screen 108 (or other viewing device) to depict the virtual world as provided by virtual world engine 116. Although in this example the virtual world is presented by set top box 100, in other embodiments, some or all rendering of the virtual world and/or advertisement content therein may be provided from another computing device, such as a PC, a gaming system, or any other suitable device or devices. The particular characteristics of switching and the signals sent to and amongst computing devices in order to present programming, virtual world advertisements, and other data will vary according to the hardware implementation, of course.

In some embodiments, when the virtual world engine 116 is launched, any viewers present are logged into the system in any suitable manner. For example, viewers may be recognized using image recognition, RFID tags, or presence may be inferred based on analyzing viewing activity. In some embodiments, the virtual world engine may remain active even when not viewed in order to reduce system loads associated with launching and exiting the virtual world engine.

Figure 3:
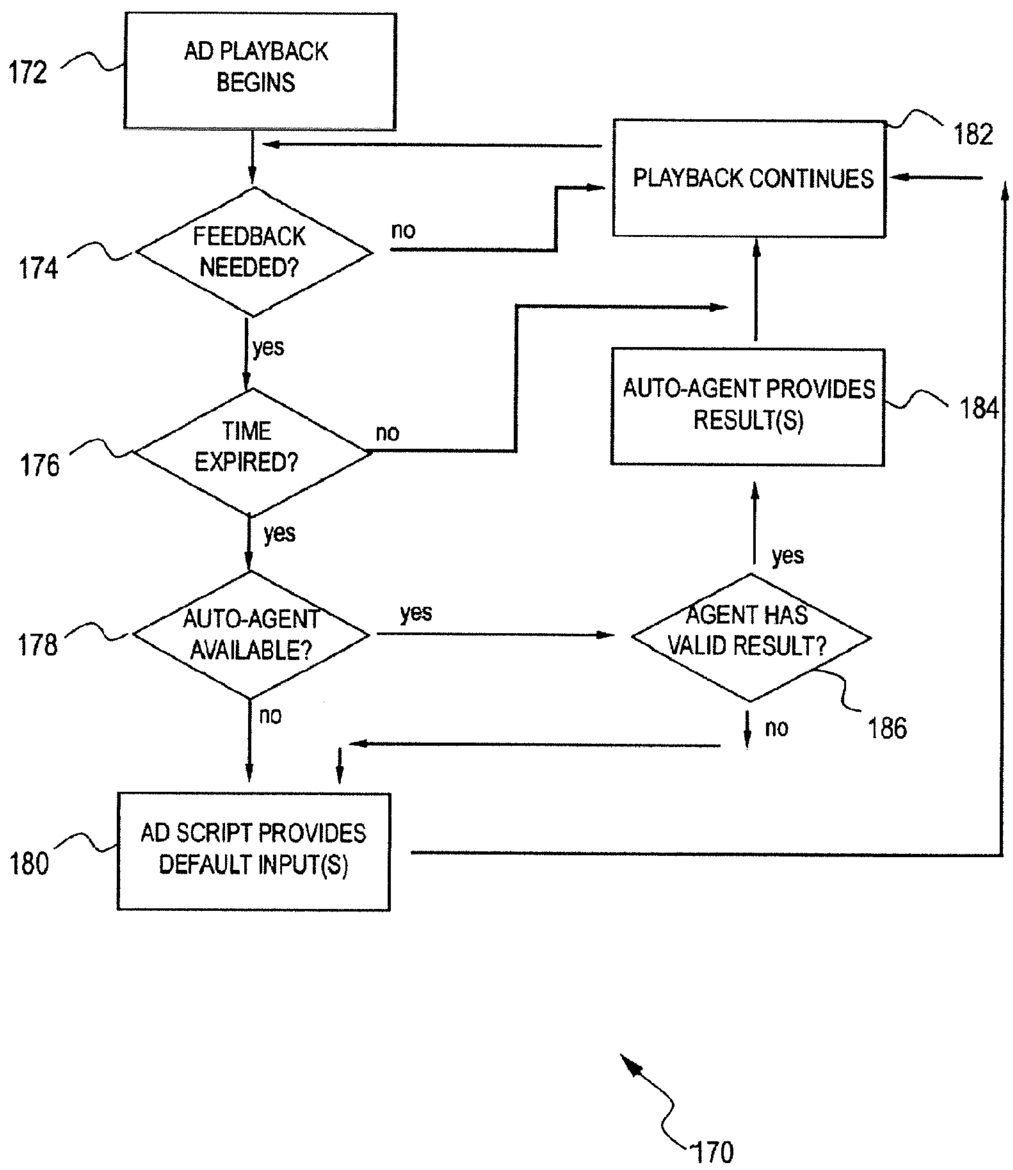
FIG. 3 is a flowchart showing steps in an exemplary playback process for a virtual world advertisement.

FIG. 3 is a flowchart showing steps in an exemplary process 170 for playing back a virtual world advertisement. Of course, as is the case of all flowcharts in the present specification, the steps may be reordered or varied in other embodiments. The ad playback process will vary according to the script(s) associated with each ad. For instance, an ad in which no feedback is possible or provided may proceed in a fairly direct manner as compared to an ad whose script provides for multiple outcomes contingent on user activity. Generally speaking, the ads are executed within the virtual world environment according to the ad script and user preferences, with advertisement playback under the control of the virtual world environment.

In this example, ad playback begins at step 172. At 174, the system evaluates whether viewer feedback is needed. If not, then at step 182 playback continues. If viewer feedback is required and a time limit is applicable for feedback, then at 176 the time limit is monitored. If time remains for feedback, the advertisement loops back to 182. If, however, an applicable time limit has expired, then at 178 the system determines if an auto-completion agent is available. The set top box or other device(s) associated with providing the virtual world advertisements may be configured to automatically respond to queries and other requests for information from ad scripts by using components such as one or more auto-completion agents. If the user has not manually provided feedback in the allotted amount of time, then the auto completion agent ("auto-agent" in FIG. 3) can provide a response as shown at 186 and 184. In some embodiments, the time limit may vary and/or no time limit may be considered; for example, a user may configure an auto-completion agent to automatically respond to some or all queries without waiting for a time period to elapse. If an auto-completion agent is not available, or if an available agent cannot provide a valid response, then at 180 the ad script provides a default response and ad playback continues. For example, the ad may continue for a predetermined time and/or until the ad script otherwise completes.

An auto-completion agent may comprise a system component "between" the user and the virtual world. For instance, an auto-completion agent may access data outside the virtual world, such as viewer profile data, in order to provide information to a virtual world ad. Although in this example, an auto-completion agent is discussed in the context of providing a response during ad playback, auto-completion agents may provide data at other times such as, for instance, when an ad is initially configured for playback or after playback. For instance, as the ad is prepared, one or more queries can be processed against the preferences/profiles of one or more users associated with the system. For example, if the system recognizes an owner, the owner or primary user's data may be used. In any event, auto completion agent(s) can provide responses to queries from ads based on data such as user preferences, personal profile information, and/or public profile information. Other data sources available to the auto-completion agent may be used in addition or in alternative to those sources.

In some embodiments, an auto-completion agent additionally or alternatively comprises an object, avatar, or other representation within the virtual world. For example, in an advertisement set in a virtual bar, a bartender avatar may ask the viewer what drink the viewer prefers. If the user does not respond, an auto-completion agent represented by another character at the bar may provide a response based on preference data for the viewer.

An auto-completion agent can be implemented as a software agent, process, component, or routine configured to provide information and otherwise interact with an ad. Additionally, an auto-completion agent can interact with a viewer and/or data regarding a viewer. Of course, any auto-completion agent may comprise one or more agents, processes, components, etc. working together and, in some embodiments, a system can comprise or support multiple auto-completion agents. Additionally, as was noted above, ad scripts can include default responses for each possible decision point. This may advantageously avoid a never-ending advertisement while the ad script awaits input. For example, if a suitable auto-completion agent is not available (or no suitable response is provided), then a default response may be used.

Auto-completion agents can obtain data in any suitable manner. For example, an ad may provide a specific query for use by auto-completion agents in determining a response. However, in some embodiments, the auto-completion agent(s) may parse a query in order to determine the best way to determine how to respond. For instance, a cola advertiser may wish to determine if the user would prefer regular or diet soda and provide for a different ad according to the user's preferred drink. A query from the ad may comprise "preferred soda type," with the auto-completion agent determining the exact syntax to use in searching user purchase (and/or other) records. Alternatively, an ad script provided in ad definition data for an advertisement by the cola advertiser may include a query such as "SELECT * FROM user purchases WHERE type='drink' and name contains 'diet'". The auto-completion agent may be configured to evaluate the results of the query in order to provide a response to the ad script. For instance, if the result set is over a certain threshold, the auto completion agent may conclude that the user prefers diet drinks and provide that data to the ad script. If the query returns an error or there is no conclusive answer, then the auto completion agent is set to "unknown" for the decision point. In such a case, the ad script would revert to the default response for determining which script alternative to utilize. The format and context of the query may vary based on ad parameters, ad delivery systems, and the underlying data source(s) used to obtain data for responding to queries.

Figure 4:
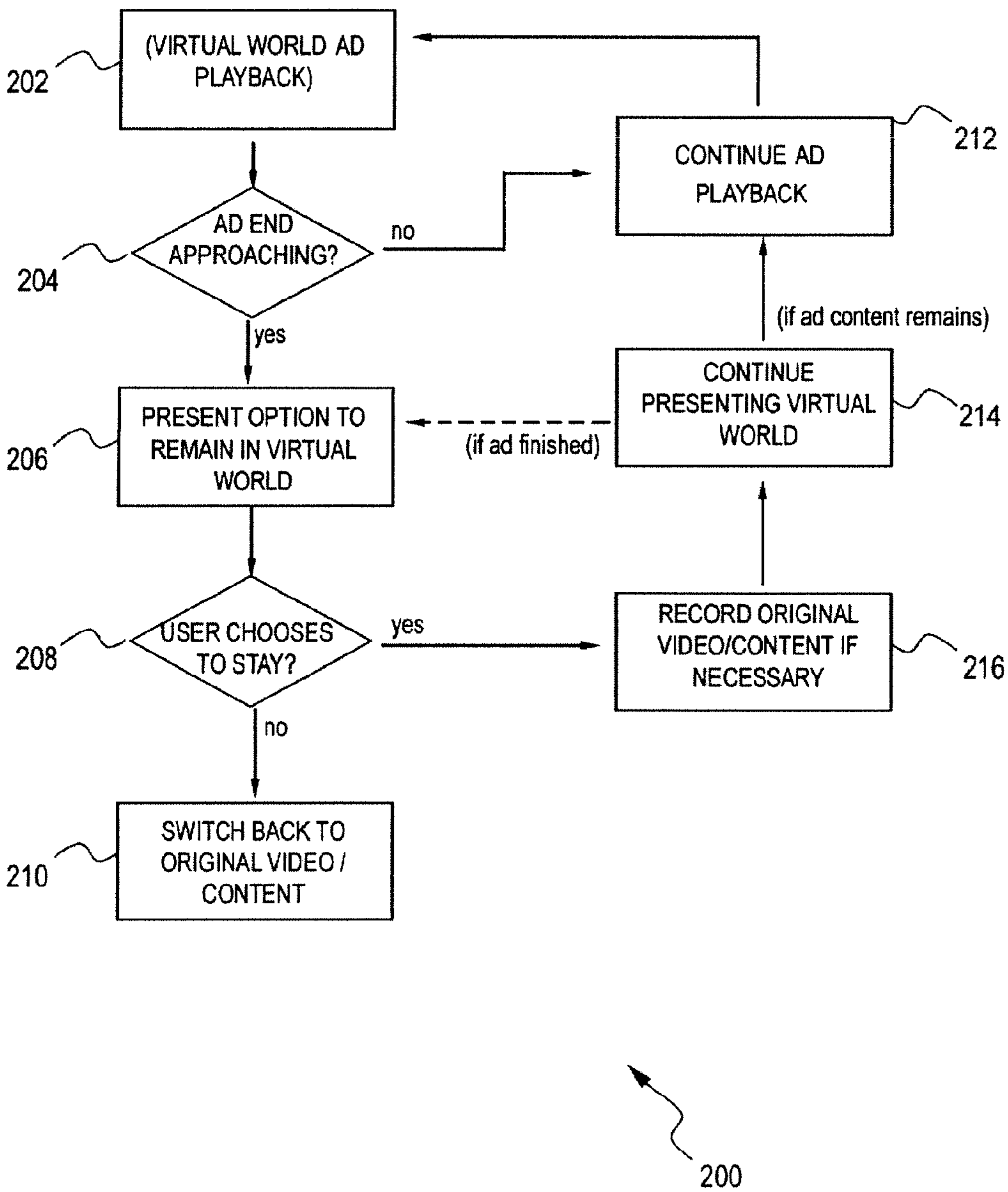
FIG. 4 is a flowchart showing steps at the end of an exemplary playback process for a virtual world advertisement.

FIG. 4 is a flowchart showing steps in an exemplary process 200 which may occur when an ad nears completion. For instance, in some embodiments, the virtual worlds may catch the attention of the user and give the user the ability and option to explore further within the virtual world or further investigate the ad within the virtual world. Thus, the user may remain in the virtual world beyond the duration of the ad. Step 202 represents the playback of a virtual world ad. At step 204, the system evaluates whether the end of the ad is approaching. For example, the ad may be set to run for a limited time or the end of the ad script may be near. If the end is not near, then at step 212 playback continues. If the end is approaching, then at step 206, the user may be presented the option to remain in the virtual world. If, at step 208, the user elects not to stay, then at step 210 the system switches back to the original video or other content stream. For example, the system may switch back to programming content or additional advertising content such as non-virtual-world ads.

However, if at step 208 the user elects to stay, then at step 216 the original video or other content stream may be recorded. For example, if the ad is provided using a set top box with personal video recorder (PVR) capabilities, the PVR components may be signaled to record the content if the content is not already being recorded or has not been recorded previously. At step 214, the virtual world continues to be rendered. If an ad has fully run its course, the process may loop to 206 so that the user may be periodically presented with the option to return to the video stream. For instance, a pop-up or notification may occasionally appear, or the system may simply occasionally check for an input such as a "return to video" command from a controller. Until the user indicates otherwise, the user may remain in the virtual world. If ad content remains, then the process loops from 214 to 212/202 to continue ad playback. For instance, all of the advertisement, or portions of the advertisement may continuously play for the entire time the user is in the virtual world after the end of the initial run of the ad. For example, if the ad comprises a sign in the virtual world, the sign may remain in the virtual world until the user exits. If the ad comprises an interactive script, then the script may run a set number of times and then end rather than repeating ad nauseum.

Figure 5:
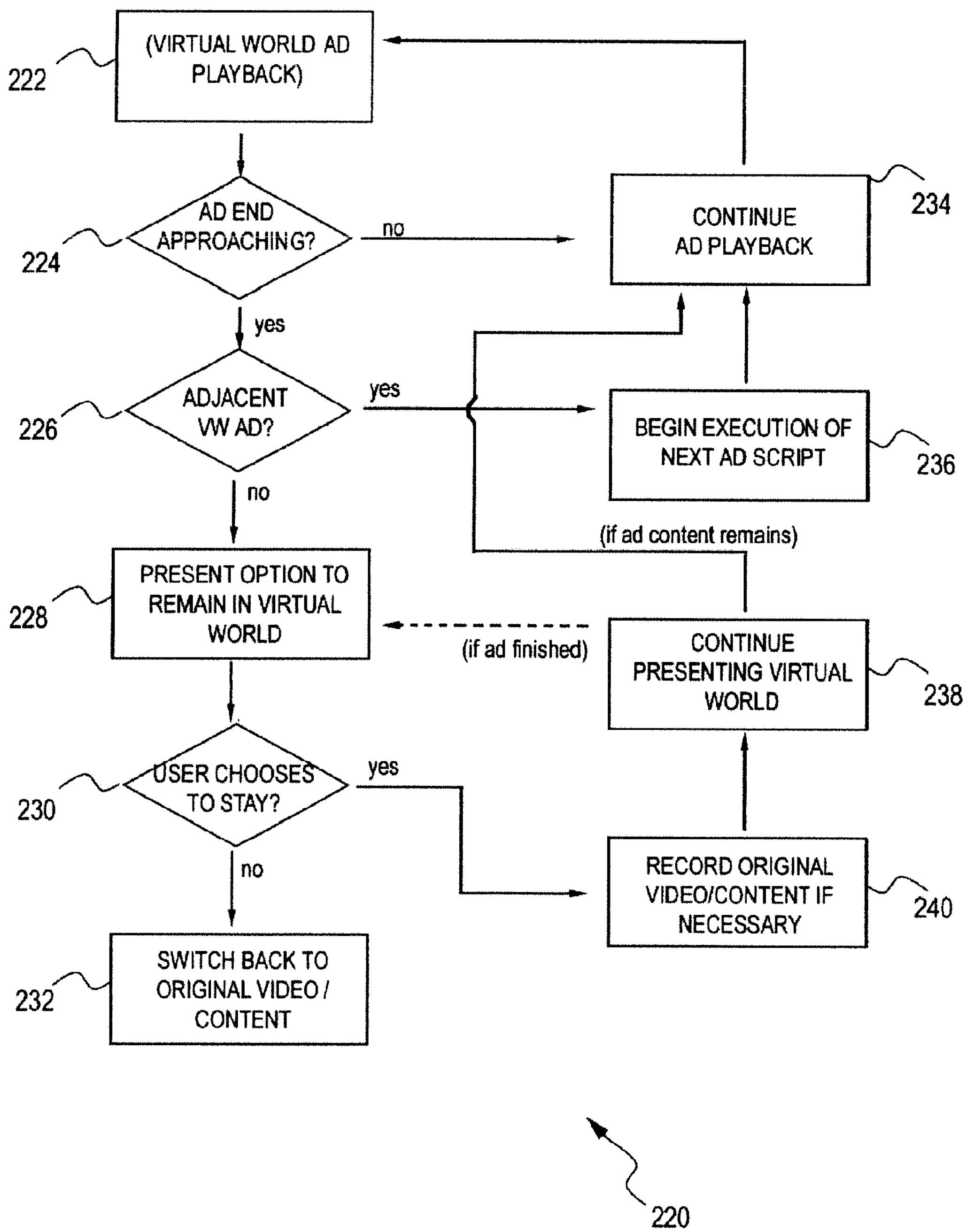
FIG. 5 is a flowchart showing steps in an exemplary process for presenting multiple virtual world advertisements.

FIG. 5 is a flowchart showing steps in an exemplary process 220 wherein multiple virtual world advertisements are presented in sequence. At step 222, ad playback continues. At step 224, the system determines whether the end of an ad is approaching. If not, then at step 234 playback continues. If the end of an ad is near, then at step 226 the system determines whether another virtual world advertisement is "adjacent." For instance, in some systems, a queue or buffer of ads may be maintained, with the queue representing an order of presentation for the ads. If one virtual world advertisement immediately follows another in the queue, then at step 236 the system may begin execution of the next ad script within the virtual world. As a prelude to step 236, the initial preparations for the next ad may begin while the first ad is in progress. Then, playback continues at 234 and 222 until no further adjacent virtual world advertisements are available. At step 228, the user is presented the option to remain in the virtual world. If, at 230, the user elects to stay, then at step 240 the system provides for recording of the video (or other content) stream if necessary and at 238 continues presenting the virtual world. If ad content remains, then playback of the current ad occurs as shown at 234/222. However, if no more ad content remains, then the process loops to 228 so that the system occasionally presents the option/monitors for feedback indicating that the user wishes to return to the video stream. If, at 230, the user elects to leave the virtual world environment, then at 232 the system switches back to the video stream or other content presentation. For example, the system may switch back to programming content or additional advertising content such as non-virtual-world ads.

Figure 6:
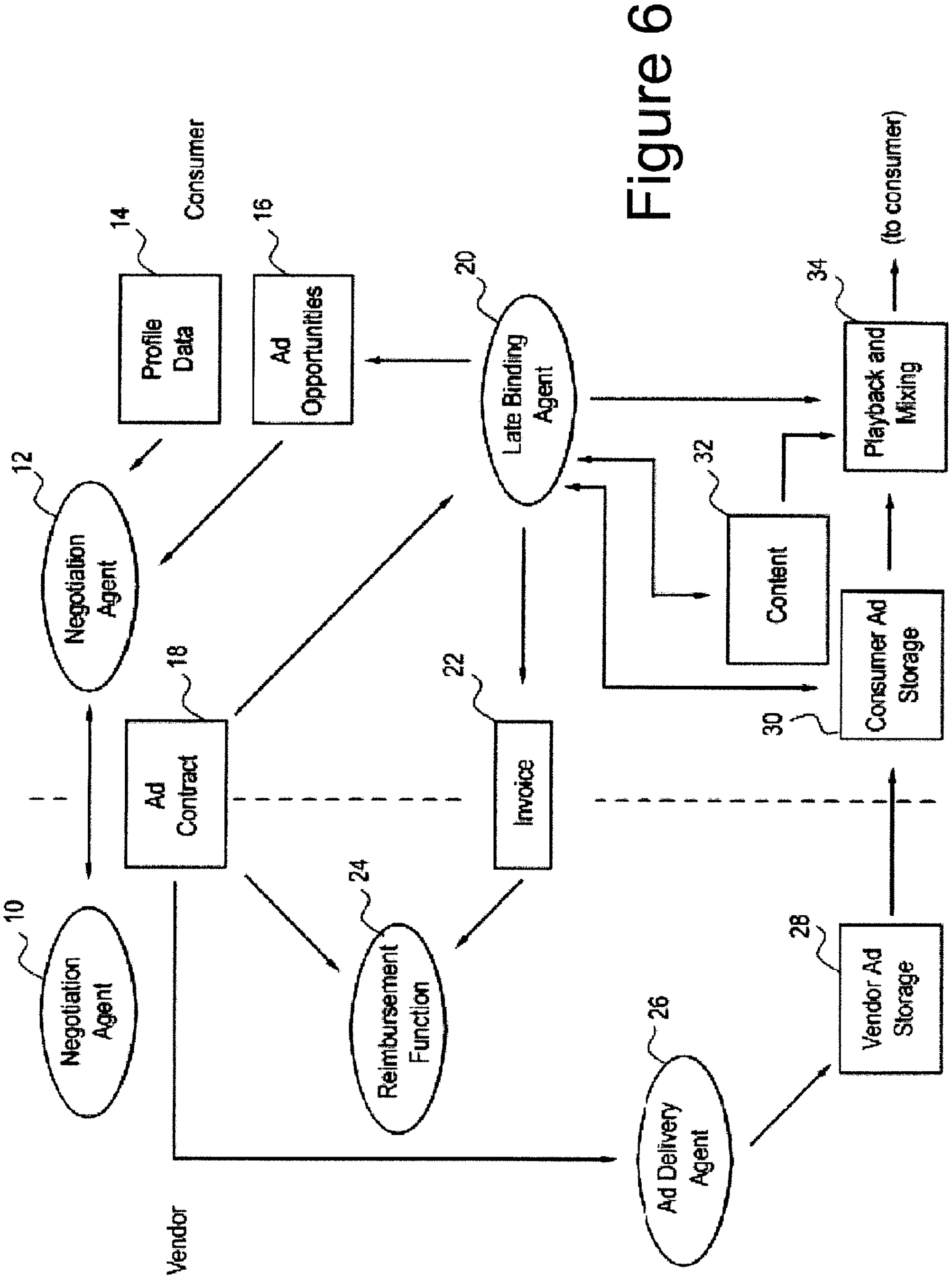
FIG. 6 is a functional block diagram of an exemplary consumer-centric advertisement distribution system.

As noted above, in some embodiments, ads may be distributed alongside or instead of conventional advertisements (i.e. non-virtual-world-advertisements) in an advertisement distribution system. FIG. 6 is a functional block diagram of an exemplary consumer-centric advertisement distribution system which may be adapted to support distribution and display of virtual world advertisements. For instance, functionality discussed in the examples above may be added to systems through additional components and/or alteration of components originally configured to obtain and provide conventional ads (i.e. non-virtual-world ads). For example, software or hardware plug-in components may be provided to enable a conventional ad distribution system to support virtual world advertisements. Additional exemplary aspects of a consumer-centric advertisement distribution system are disclosed in U.S. Utility patent application entitled "AUCTION-BASED ADVERTISING INCLUDING CONSUMER-SUITED AD DISTRIBUTION", filed Feb. 23, 2007 and assigned U.S. Ser. No. 11/678,261, which is incorporated by reference herein in its entirety for all purposes.

However, before turning to FIGS. 6-7, it is worth emphasizing that discussions of exemplary distribution systems are not meant to limit the present subject matter. Instead, virtual world advertisements can be provided using any suitably-configured distribution system or systems. For example, in several of the foregoing examples, a virtual world advertisement was received and stored in a queue, such as by downloading a package defining the advertisement. However, in other embodiments, virtual world advertisements may be received as part of a broadcast or video stream. For example, an MPEG-2 (or other suitable) video stream may contain a virtual world advertisement. The video stream may comprise the actual advertisement data (such as ad definition data) or a link or other specifier identifying where to obtain the data. The computing devices that provide the virtual world advertisements can be configured to look ahead into the video stream and identify/obtain the components in order to prepare and present virtual world advertisements as discussed above. However, rather than processing an ad based on its position in an ad queue, the ad can be processed when the look ahead function identifies an ad in the video stream. Combinations of queue-based distribution, stream-based distribution, and/or other distribution modes can be used, as well.

FIG. 6 is divided by a dashed line illustrating the division between components on the vendor side and the consumer side. This example will first discuss an exchange between a consumer and a single vendor. However, as will be noted below, in some embodiments, each consumer may interact with multiple vendors and/or each vendor may interact with multiple consumers. Additionally, while a vendor is the advertising entity in several examples herein, the use of a vendor is not intended to be limiting. Rather, advertising entities may comprise other types of single individuals, groups of individuals, or other entities seeking to advertise to one or more other individuals, groups, or entities.

In operation, a software-based negotiation agent (or multiple agents) 10 acting on behalf of a vendor engage in negotiations with corresponding software-based negotiation agent (or agents) 12 acting on behalf of the consumer. Negotiation agent(s) 12 may include functionality provided by ad solicitation agent 112 in the examples above or a separate agent may be utilized for obtaining virtual world advertisements. Consumer negotiation agent 12 accesses data including profile data 14 and ad opportunity data 16 and, based on the profile data 14, ad opportunity data 16, and any other consumer-specified rules, preferences and parameters, attempts to negotiate one or more ad contracts 18 between the vendor and the consumer. Ad opportunity data 16 is provided at least in part by late binding agent 20, which will be discussed in further detail below. Generally speaking, ad opportunity data 16 represents information indicating what resources (including both time and hardware) are available for negotiation.

Assuming a successful negotiation, ad contract 18 is established between the consumer and a vendor. Then, based on ad contract 18, several actions take place. On the vendor side, the data in ad contract 18 is used by vendor ad delivery agent to select one or more ads stored in vendor ad storage 28 to deliver to the consumer's ad storage 30 in accordance with the contract. On the consumer side, late binding agent 20 uses data including terms from ad contract 18 to display the ad(s) in accordance with the terms of the contract. Playback and mixing circuitry/software is directed by late binding agent 20 to mix stored content 32 and one or more stored ads 30 for display to the consumer. Then, late binding agent 20 generates and transmits invoice 22 to the vendor based on the terms of contract 18. Invoice 22 is received by reimbursement function 24, which may be another software routine or agent configured to compensate the consumer based on the terms of ad contract 18. For virtual world advertisements, late binding agent may include functionality provided by ad insertion system 114 or may work in conjunction with ad insertion system 114 in some embodiments.

Aspects of the exemplary components shown in FIG. 6 will now be discussed in closer detail. Vendor negotiation agent 10 and consumer negotiation agent 12 may each comprise any suitable type of software agent that engages in one or more negotiations according to rules specified by the party on whose behalf the agent is acting.

For instance, in some embodiments, consumer negotiation agent 12 comprises an auction agent that auctions advertising opportunities to one or more vendors. In such embodiments, vendor negotiation agent 10 can comprise an auction bidding agent. When configured as an auction agent, consumer negotiation agent 12 may offer advertising opportunities to one or more vendors in exchange for economic incentives. Depending upon consumer and vendor preferences, these incentives can include any suitable transfer of value or services, including, but not limited to, payments from the vendor, discount coupons, or free items or content. The desired economic incentive can be included in factors defined by the consumer for use by agent 12 in conducting the auction and evaluating bids.

For instance, the consumer-defined factors may include but are not limited to: the degree an offered ad matches the consumer's tastes and interests, availability of bandwidth for receiving ads, availability of ad storage space, availability of time for viewing the ad, and the consumer's willingness to view advertisements. For virtual world advertisements, as noted above, another consideration may include whether a particular advertisement is compatible with the consumer's system (e.g. whether the ad format is compatible with the consumer's virtual world engine). When multiple vendors wish to purchase the same advertising opportunity, the consumer may select the most desirable vendor(s) in terms of the incentive that is offered and other characteristics such as the particular vendor, the type of product being advertised, and the nature of the advertisements. In some situations, competition amongst the vendors may result in more incentive per advertising opportunity offered by the consumer.

Some factors defining the conduct of agent 12 may be explicitly defined by the consumer, such as a minimum payment or discount that must be received or a maximum amount of advertising time that is to be made available. However, some factors may be inferred from information regarding the consumer that is available to negotiation agent 12. For instance, consumer profile data 14 may be used by negotiation agent 12 to determine areas of interest (and disinterest) for the consumer. Profile data 14 may comprise any information about the consumer that is available from any source or sources. Profile data 14 may include consumer content and advertising viewing records, purchase and financial records, and personal and demographic information about the consumer. In some embodiments, profile data 14 may comprise a plurality of sets of profile data about a consumer. The sets can include public profile data that is available for release to potential advertising providers as part of the contract negotiation or execution and private profile data that is available only to consumer agents such as negotiation agent 12 and late binding agent 20.

Consumer negotiation agent 12 may also consider other data. For example, FIG. 6 shows that ad opportunity data 16 has been provided by late bidding agent 20 for use by negotiation agent 12. Ad opportunity data 16 may include data that indicates the type and extent of advertising opportunities that are available for negotiation. For instance, ad opportunity data 16 may comprise scheduled recordings, downloads, or viewings of content. Additionally or alternatively, ad opportunity data may indicate the consumer's viewing status in real-time or near-real time. For example, if a consumer is viewing a program, ad opportunity data may include unsold or otherwise uncommitted advertising time for the program that is being viewed. The ad opportunity data may also include information indicating available ad storage space and network bandwidth for receiving ads.

Vendor negotiation agent 10 may comprise an auction bidding agent acting on behalf of a vendor based on various rules, preferences, and other parameters specified by the vendor. For instance, a vendor may provide rules that specify how advertising opportunities are to be valued and how bidding is to proceed. Bids may be determined based on factors including, but not limited to, the match of an ad to a consumer, the length of the ad, the size and quality of storage and other resources needed to display the ad, and the initial bidding price offered for the ad. The vendor may maintain one or more data stores that include information used by the vendor to value advertising opportunities. For example, vendor negotiation agent 10 may have access to one or more databases that define the vendor's advertising budget, objectives, and strategy. For instance, the vendor may desire to target certain groups or types of consumers more heavily than others. Vendor negotiation agent 10 may be configured to provide greater incentives for ad opportunities related to the targeted consumers and less (or no incentives) to the non-targeted consumers.

Regardless of the type of negotiation, as noted above, consumer negotiation agent 12 may be configured to release certain information about a consumer as part of the negotiation process with vendor negotiation agent 10. For instance, vendor negotiation agent 10 may access information about the consumer to determine if the consumer is in the desired audience for a particular advertisement. In embodiments in which vendors bid on advertising opportunities, the bid price offered by vendor agent 10 may increase for consumers that are a more "desirable" match as defined by the vendor. Similarly, in embodiments in which consumer agents solicit for the opportunity to receive ads and advertising incentives, vendor agents 10 may consider the degree of match in determining which consumer bids to accept. As an example, if the vendor is a local microbrewery, the vendor negotiation agent 10 may evaluate potential advertisement opportunities based on whether the consumer that is providing the opportunities is in a certain age/income demographic and/or has bought beer recently. For instance, the microbrewery may configure its agent to bid only in consumer auctions offered on behalf of beer drinkers, or may configure its agent to bid lower in auctions offered by moderate beer drinkers. In situations in which the brewery is offering advertisements to be solicited by consumers, the brewery agent may be configured to reject offers from moderate beer drinkers, even if such offers are lower (i.e. cheaper) than those of beer drinkers.

The level of detail of the information released to vendor agent 10 may vary based on consumer privacy settings and may affect the bidding price or incentive amount the vendor is willing to offer. For example, if a consumer agent 12 releases vague information about the consumer, vendor agent 10 may offer a lower bid or change the maximum incentive amount available. This may be due to rules explicitly tying acceptable incentive levels to the amount of information available and/or due to the fact that a closer match is not possible due to limited information.

Once vendor negotiation agent 10 and consumer negotiation agent 12 reach agreement, the terms are memorialized in ad contract 18. Ad contract 18 comprises the consumer's agreement to provide one or more advertising opportunities to the vendor and the vendor's agreement to provide the agreed-upon incentive(s). Terms and other information that may be included in the contract may include, but are not limited to: unique identification of the vendor, unique identification of the consumer or display means, data identifying the ad(s) to be shown, such as ad serial numbers or unique IDs, format definitions for the ad(s), ad metadata for matching the ad(s) to programming, ad ratings (such as ratings defined by the TV Parental Guidelines system) or content flags, time and method of delivery, times when the ad can/cannot be played, terms of payment for each display of the ad, when the ad is to be discarded (if ever), and any other suitable term or terms.

Of course, any of the above-mentioned terms (and any other terms) may be used in defining the conduct of negotiation agents 10 and 12. For instance, each party may define certain terms as non-negotiable and other terms as dependent on price. Rules for the auction and bidding process may then depend on the consumer's preferred terms. As an example, a consumer may define rules whereby the contract must prohibit "adult"-flagged ads and that the term is non-negotiable, while other terms regarding ad display resolution or bandwidth may be price-dependent (such as requiring higher bids for higher quality). Similarly, for a particular advertisement, a vendor may insist that any ad contract regarding that advertisement must provide for the ad to be shown during a certain time period or alongside certain content, while the number of showings is price-dependent (such as providing higher bids when more showings are offered).

For example, as noted above, a consumer may provide rules that prohibit consumer negotiation agent 12 from entering a contract to display ads of an adult nature. Therefore, if the consumer is auctioning an advertising opportunity, an offer from an advertiser of an ad with adult content may be refused, even if advertiser is offering an incentive that is higher than the other advertisers. Similarly, if the consumer is soliciting for an opportunity to receive ads, consumer negotiation agent 12 may be configured to ignore advertising opportunities where the offered ad is adult in nature, even if the incentive offered is above the consumer's threshold for acceptable incentive amounts. Of course, in either case, if the advertiser provides for a non-adult version of the ad to be available, successful negotiation may still be possible.

Contract 18 may be maintained as one or more components and in any suitable form or forms. For instance, both the consumer and the vendor may maintain a copy of contract 18 for future reference. In some embodiments, a copy of contract 18 may be provided to one or more third parties for safekeeping and/or verification in the event of a later dispute as to contract terms.

Once advertising contract 18 has been established between the consumer and the vendor, the remaining components of the advertising distribution system can access the terms of contract 18 and take steps to execute those terms. On the vendor side, one or more ad delivery agents 26 select ads from vendor ad storage 28 to send to the consumer. For instance, the vendor may maintain one or more repositories of ads for use with different audiences, and the appropriate ad may be selected based on information about the consumer. For example, a store may have produced a specific advertisement for English-speaking viewers and another advertisement for Spanish-speaking viewers. Based on consumer demographic or other information (and the contract terms), the appropriate ad may be selected.

For example, during the negotiation process, the vendor may have learned that the consumer is in a certain demographic (or the vendor may have only participated in negotiations where the consumer is in a desired demographic) and may select an ad that matches the demographic. Such consumer information may be provided, for example, by vendor negotiation agent 10. Alternatively, information used in selecting the ad may be included in contract 18. For instance, as noted above, contract 18 may specify the type of ad(s) to any degree of granularity, even to the point of uniquely identifying one or more particular advertisements in the contract. In any event, ad(s) that conform to contract and any vendor preferences are transmitted to consumer ad storage 30.

The ads may be transmitted in any suitable manner. For example, both the vendor and consumer may maintain connections over one or more wide-area networks such as the Internet. In other embodiments, the advertisements may be transmitted by other network connections—for instance, the ads may be transmitted using a cable television system's distribution channels to the consumer for video-on-demand content when such channels are not in use.

In some embodiments, the ad(s) are distributed out-of-band with regard to the content for display. For instance, the ad(s) may be provided to the consumer for storage separately from any content the ads are to be displayed with. As an example, a consumer and vendor may negotiate for display of an ad preceding a certain type of pay-per-view move. For instance, a camping equipment company may negotiate the display of an ad for survival equipment preceding an action movie. The ad may be distributed to the consumer where it is maintained in storage. The consumer may conceivably not view an action movie until after a considerable time after the time the ad is received.

Ad display can be handled by a consumer-side late binding agent 20 running on one or more computing devices associated with the consumer. For instance, the late binding agent may be included in software running on a television set top box (STB). Although various examples herein use a set top box, the functionality provided by components such as the late binding agent, viewer profiles, ad storage, video content storage, and user interface may be provided any suitable hardware including, but not limited to, the set top box, a personalized video recorder, personal computer, multi-function multimedia center, home gateway router, dedicated computing device, and remote proxy server or client.

Based on data including the terms of contract 18, the consumer's viewing activity, and consumer preferences, late binding agent 20 selects one or more stored ads and directs playback and mixing software/circuitry to mix and otherwise display the ads with content 32. Details of an exemplary late binding agent 20 are discussed in FIGS. 2A and 2B. As noted above, for virtual world ads, ad insertion system 114 may handle some or all of generating the virtual world ad alone or in conjunction with a late binding agent. In some embodiments, functionality provided by late binding agent 20 and ad insertion system 114 may be provided by the same software agent(s) or other component(s).

Figure 7A:
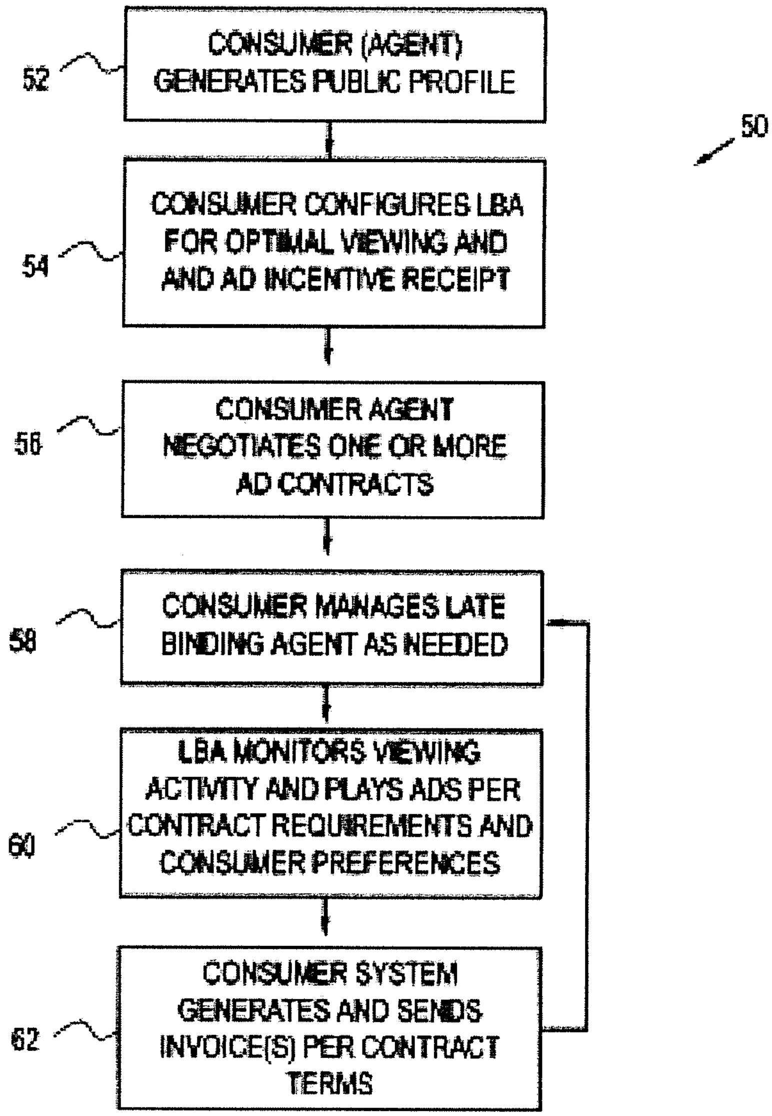
FIG. 7A is a flow chart showing exemplary steps in a method for negotiating and implementing display of one or more advertisements.

FIG. 7A is a flowchart that includes steps in an exemplary process 50 performed by a late binding agent alongside some actions performed by consumer negotiation agent 12. First, at step 52, the consumer (and/or a profiling agent acting on behalf of the consumer) generates one or more profiles including a public profile of the consumer. For instance, the public profile may include data about the consumer's tastes, interests, viewing habits, and the like that the consumer is comfortable revealing. For instance, as noted above in FIG. 6, consumer profile data 14 may be used in the negotiation process. At step 54, the consumer configures the late binding agent (LBA) for optimal viewing and ad incentive receipt. For instance, the consumer may specify preferred types and amounts of incentives, preferred advertising content and amount, and other information relating to the consumer's viewing preferences. This information can be included in the data used to control the actions of late binding agent 20. The parameters may be provided through a consumer preferences interface, which may, for example, comprise a graphical user interface provided via the consumer's set top box and/or other computing device, such as a home computer.

At step 56, one or more consumer agents negotiate one or more ad contracts as noted above. Steps 58, 60, and 62 generally represent ongoing activity with regard to the late binding agent. For instance, at step 58, the consumer manages the late binding agent on an as-needed basis. Step 58 is meant to include feedback provided by the consumer and maintenance tasks and other interventions. For example, the consumer may indicate that certain advertisements/programming are preferred or disliked. As another example, the consumer may delete certain advertisements or content from storage. As a further example, the consumer may set (and/or update) programming and advertisement preferences and restrictions, such as locking out certain programming, categories of advertisements, and/or channels.

At step 60, the late binding agent monitors activity and plays ads in accordance with contract requirements and consumer preferences. Of course, the late binding agent may consider other parameters, such as requirements provided by the content provider—for example, a cable company may mandate that viewers play certain advertisements at certain times. At step 62, the late biding agent (or other software) generates and sends one or more invoices per the terms of the stored ad contract(s).

Figure 7B:
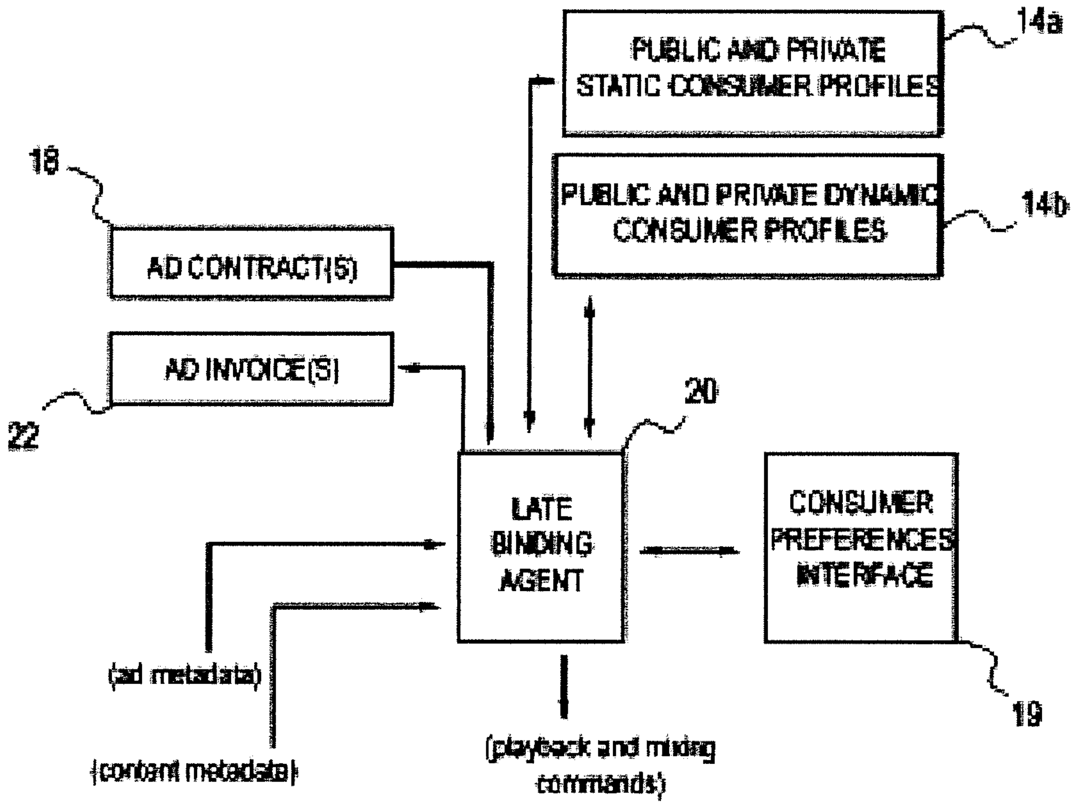
FIG. 7B is a block diagram showing an exemplary late binding agent in the context of exemplary data provided to the agent and by the agent.

FIG. 7B is a block diagram showing an exemplary late binding agent 20 in further detail. In this example, late binding agent 20 has access to stored ad contract or contracts 18. Based on data including ad metadata, content metadata, profiles 14*a* and 14*b*, and consumer preferences provided via consumer preferences interface 19, late binding agent 20 provides playback and mixing commands such that advertisements are presented to the consumer at the optimal time and in accordance with the terms of the applicable contract or contracts. Then, late binding agent 20 generates one or more invoices 22 in order that the consumer receives payment. Profiles 14*a* and 14*b* may each represent one or more static and dynamic consumer profiles, respectively. For instance, the system may maintain both a static private profile of the consumer and a static public profile of the consumer alongside dynamic private and public profiles. For example, the dynamic profile(s) may be based on an ongoing viewing session or recent viewing activity. As was noted above, the public profiles may be used for providing data during negotiations and other interactions with outside entities, while the private profiles may be used internally by the consumer's software agents.

Returning to FIG. 6 and the example of the camping store's survival gear advertisement, late binding agent 20 monitors the consumer's viewing activity with regard to content 32. For example, the consumer may use the STB to order an action movie that is downloaded to local storage for later viewing. Late binding agent 20 monitors the consumer's viewing activity and consults stored ad contract 18 to determine if the ordered movie meets the terms of the contract and that other terms of the contract are satisfied. For example, as noted above, the terms may provide that ads are to be discarded or age out of the system after a certain time period. If the movie is ordered after the survival gear ad has aged out of the system, then a different (or no) advertisement may be displayed. However, assuming that the ad has not aged out of the system, the ad may be presented to the consumer when the action movie is played. For example, the STB may insert the ad for camping gear following the movie.

After the advertisement is displayed, late binding agent 20 generates an invoice 22 and sends the invoice to the applicable vendor. Invoice generation and transmittal is carried out pursuant to the terms of ad contract 18. For example, ad contract 18 may provide for terms that vary based on the circumstances of ad display. For instance, the incentive due to a consumer may depend on factors including, but not limited to: when an ad is displayed, the particular content during which the ad is displayed, and whether ad viewing is confirmed. For example, ad contract 18 can include a bonus term that increases the ad payment if the ad is actually viewed. Ad contract 18 may also specify how the invoice 22 is to be delivered, such as the format, required data, and network address for electronic delivery. Based on the terms of contract 18 and the circumstances of the display of the ad, late binding agent 20 constructs one or more invoices. For instance, if profile (or other data) indicates that the consumer actually viewed the ad, then (if the contract provides for a bonus) invoice 22 may include a demand for higher payment to the consumer. The invoice may further include feedback or other data. For instance, the invoice may include data that confirms that the consumer actually viewed the ad that was displayed. If contract 18 provides for options (such as alternative payment options), then late binding agent 20 may select the most favorable options based on consumer preferences.

Invoice 22 is received by reimbursement function 24, which may comprise one or more software programs, processes, components or software agents operating on behalf of the vendor. For example, reimbursement function 24 may include software that compares data included in invoice 22 to the terms of the ad contract 18 to ensure that all terms have been met and to schedule payment or delivery of other incentive(s) to the consumer. Any suitable incentive or incentives may be provided. As an example, incentives can include direct payments to bank or merchant accounts, vendor service credits or coupons, credit on broadband access, content provider, or other bills, or other incentives such as airline miles or credit-card reward points. Reimbursement function 24 may include interfacing with other vendor systems, such as internal accounting systems and/or third party systems to ensure that the consumer is paid in accordance with the contract terms. Any suitable payment systems and methodologies may be used. Invoice 22 may be provided directly to the vendor and/or may be sent by late binding agent 20 to one or more third parties (if designated in the contract) for handling payment.

As was noted above, in some embodiments, payment terms may depend on factors including whether an ad is actually viewed by a consumer, and not just displayed. Any suitable method(s) may be used to confirm viewing. For example, a virtual world ad may be interactive, with viewing confirmed by determining if one or more actions taken by the consumer during the ad were the result of actual consumer feedback and not default actions. Feedback data based on the response or responses provided by the consumer (if any) during advertisements may be included in invoice 22.

The invoice may be generated and/or delivered at the time an ad is displayed, viewed, and/or at another time, depending on the terms of the contract. For example, the contract may provide for an ad to be played ten times. Thus, an invoice may not be sent until after the ad has been played a tenth time. Alternatively, if the contract provides for partial payments, multiple invoices may be sent. Although not discussed in detail herein, an invoice may be generated and sent upon download of an advertisement if the contract terms provide for payment regardless of whether the ad is displayed or viewed. Additionally, invoices may be sent singly in some embodiments and in batches or groups in some embodiments.

As noted above, in some embodiments, consumers auction or otherwise sell (to one or more vendors) the opportunity to provide an ad. However, in other embodiments, a vendor may conduct negotiations in which one or more consumers solicit the opportunity to receive ads and incentives from the vendor. In such embodiments, for example, the vendor may offer a maximum incentive and the consumers then offer advertising opportunities in exchange for the incentive amount. Competition amongst consumers may advantageously result in better advertising opportunities per unit of incentive as the consumers compete with one another for the incentive(s) offered by the vendor.

The particular exemplary embodiments of a consumer-centric advertising system discussed above are not intended to limit the subject matter. For instance, the consumer-centric advertising distribution system could be modified or adapted to provide for virtual world advertisement delivery across multiple devices or to manage virtual world advertisement inventory in a more sophisticated manner. As another example, other advertising distribution systems could be used in distributing virtual world ads.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. An advertising device comprising:

memory; and a processor associated with the memory, the processor adapted to:

determine which devices associated with a plurality of users are capable of joining a virtual world environment;

invite a user of the plurality of users having a device capable of joining the virtual world environment to participate in a collaborative virtual world environment;

render and distribute the collaborative virtual environment to an invited user;

synchronize an advertisement with the collaborative virtual world environment; and execute the advertisement within the collaborative virtual world environment as the invited user interacts with a media stream, wherein the advertisement is played to the invited user within the collaborative virtual world environment and the media stream is separate from the collaborative virtual world environment.

2. The advertising device as set forth in claim 1, wherein said processor is further adapted to invite at least one other user to participate in the collaborative virtual world environment.

3. The advertising device as set forth in claim 2, wherein determining which devices associated with a plurality of users are capable of joining the virtual world environment further comprises determining if time slots within the media stream associated with the devices associated with the plurality of users are capable of being synchronized.

4. The advertising device as set forth in claim 2, wherein the processor is further adapted to invite users specified on a predetermined list of users established by a given user.

5. The advertising device as set forth in claim 2, wherein the processor is further adapted to invite a user based on one parameter matched to a profile associated with a given user.

6. The advertising device as set forth in claim 2, wherein said processor is further adapted to receive a response from the invited user, wherein said response designates an acceptance or rejection of the invitation to participate in the collaborative virtual world environment.

7. The advertising device as set forth in claim 6, wherein the executed advertisement comprises an advertisement that is broadcast to all users who have accepted the invitation to participate in the collaborative virtual world environment.

8. The advertising device as set forth in claim 6, wherein said processor is further adapted to receive rescission requests from one or more invited users who previously accepted the invitation to participate.

9. The advertising device as set forth in claim 1, wherein said processor is further adapted to select at least one virtual world advertisement for execution, and wherein said selecting comprises choosing an advertisement that is matched to at least one parameter associated with one or more users.

10. The advertising device as set forth in claim 1, wherein the collaborative virtual world environment is configured in part on at least one preference associated with the user.

11. The advertising device as set forth in claim 1, wherein said processor is further adapted to execute the advertisement with the collaborative virtual world environment by executing an ad script.

12. The advertising device as set forth in claim 1, wherein the processor is further adapted to select an advertisement time slot having a predetermined length, wherein the advertising time slot is associated with a programming event.

13. The advertising device as set forth in claim 1, wherein said processor is further adapted to:

provide the advertisement to a second computing device, wherein said second computing device is adapted to present the advertisement to the user.

14. The advertising device as set forth in claim 1, wherein said processor is further adapted to:

negotiate with at least one advertising entity, including establishing at least one contract regarding display of the advertisement to the user; and download a data package comprising ad definition data for the advertisement.

15. The advertising device as set forth in claim 14, wherein said processor is further adapted to provide an invoice to the at least one advertising entity if the advertisement is displayed in accordance with the at least one contract.

16. The advertising device as set forth in claim 1, wherein said advertising device further comprises:

an advertisement queue defining an order of presenting ads, wherein said processor is further adapted to execute at least a first and second virtual world advertisement that are adjacent to one another in the order defined by the advertisement queue.

17. The advertising device as set forth in claim 1, wherein the processor is further adapted to synchronize the execution of the advertisement by coordinating execution at substantially the same time at the advertising device and at a device associated with the invited user during the execution of the advertisement.

18. The advertising device as set forth in claim 1, wherein the processor is further adapted to coordinate execution of the advertisement within the collaborative virtual world environment whereby execution results in at least some time overlap of executed advertisements during synchronization of the execution of the advertisement.

19. The advertising device of claim 1, wherein the advertising device is further configured to switch between multiple virtual world environments.

20. The advertising device of claim 1, wherein the processor includes a collaborative advertisement application.

21. A method of configuring a collaborative advertising environment, comprising:

determining which devices associated with a plurality of users are capable of joining a virtual world environment;

inviting a user of the plurality of users having a device capable of joining the virtual world environment to participate in a collaborative virtual world environment;

rendering and distributing by a computing device the collaborative virtual world environment to an invited user;

synchronizing by the computing device an advertisement with the collaborative virtual world environment; and executing by the computing device the advertisement within the collaborative virtual world environment as the invited user interacts with a media stream, wherein the advertisement is played to the invited user within the collaborative virtual world environment and the media stream is separate from the collaborative virtual world environment.

22. The method as set forth in claim 21, wherein said determining which devices associated with a plurality of users are capable of joining the virtual world environment further comprises determining if time slots within the media stream associated with the devices associated with the plurality of users are capable of being synchronized.

23. The method as set forth in claim 21, wherein the plurality of users is identified from a predetermined list of users established by a given user.

24. The method as set forth in claim 21, wherein the plurality of users is characterized by at least one parameter matched to a profile associated with a given user.

25. The method as set forth in claim 21, wherein executing the advertisement within the collaborative virtual world environment comprises executing an ad script.

26. The method as set forth in claim 21, the method further comprising selecting an advertisement time slot having a predetermined length, the advertisement time slot associated with a programming event.

27. The method as set forth in claim 26, further comprising accessing consumer preference data for the plurality of users such that the advertisement and the collaborative virtual world environment are configured in accordance with a consumer preference associated with one or more of the plurality of users.

28. The method as set forth in claim 26, further comprising continuing to render the collaborative virtual world environment after completing execution of the advertisement.

* * * * *